US008649965B2

(12) United States Patent
Funabashi

(10) Patent No.: US 8,649,965 B2
(45) Date of Patent: Feb. 11, 2014

(54) VEHICULAR DISPLAY APPARATUS

(75) Inventor: Junichiro Funabashi, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/613,504

(22) Filed: Sep. 13, 2012

(65) Prior Publication Data

US 2013/0090843 A1 Apr. 11, 2013

(30) Foreign Application Priority Data

Oct. 5, 2011 (JP) ................................ 2011-220959

(51) Int. Cl.
*G05D 1/02* (2006.01)
*G06F 17/10* (2006.01)
*G06G 7/78* (2006.01)

(52) U.S. Cl.
USPC .......................................... 701/300; 340/435

(58) Field of Classification Search
USPC .................... 701/300, 432; 700/432; 340/435
See application file for complete search history.

(56) References Cited

U.S. PATENT DOCUMENTS 5,475,494 A 12/1995 Nishida et al.
5,945,917 A * 8/1999 Harry ...................... 340/815.45
6,675,650 B1 * 1/2004 Paulo ............................ 73/491
7,194,358 B2 * 3/2007 Callaghan et al. ........... 701/301
8,362,891 B2 * 1/2013 Schumann et al. .......... 340/438
2004/0051659 A1 * 3/2004 Garrison ......................... 342/70
2005/0100169 A1 * 5/2005 Shelley et al. ................. 381/58
2006/0092770 A1 * 5/2006 Demas .......................... 368/223

FOREIGN PATENT DOCUMENTS

JP B2-3599267 12/2004
JP 2006-072725 3/2006

* cited by examiner

*Primary Examiner* — Fadey Jabr
*Assistant Examiner* — Paula L Schneider
(74) *Attorney, Agent, or Firm* — Harness, Dickey & Pierce, PLC

(57) ABSTRACT

A vehicular display apparatus in a host vehicle is provided with a display output portion including a ring-shaped light-emitting area that represents presence of a different vehicle. A direction specification processor specifies a direction indicating presence of the different vehicle with reference to the host vehicle based on position information about the host vehicle and the different vehicle. A distance specification processor specifies a distance between the host vehicle and the different vehicle based on position information about the host vehicle and the different vehicle. A display control processor displays part of the light-emitting area so that the displayed part is positioned in a direction specified by the direction specification processor and has a length based on a distance specified by the distance specification processor.

9 Claims, 24 Drawing Sheets

VEHICULAR DISPLAY APPARATUS

CROSS REFERENCE TO RELATED APPLICATION

This application is based on Japanese Patent Application No. 2011-220959 filed on Oct. 5, 2011, the disclosure of which is incorporated herein by reference.

TECHNICAL FIELD

[Patent document 1] JP 2006-72725 A

The present disclosure relates to a vehicular display apparatus, which is provided in a host vehicle and displays information for recognizing a different vehicle that is present in vicinity of the host vehicle.

BACKGROUND

There has been proposed an apparatus that displays information for recognizing a different vehicle around a host vehicle. To distinctively indicate a host vehicle and a different vehicle, for example, the apparatus disclosed in Patent document 1 displays the different vehicle around the host vehicle in an alarm color, blinks the different vehicle, reverses its color, or displays the host vehicle in blue and the different vehicle in red.

The apparatus described in Patent document 1 displays only a different vehicle, which is present within a specified range or a display frame from the host vehicle, at a position where the different vehicle is located. Accordingly, the apparatus cannot display a different vehicle outside of the display frame. However, a different vehicle might be running fast even if it is distant or remote from the host vehicle and is outside of the display frame. Careful attention must be also paid to the different vehicle. To that end, the display scale may be changed to display the different vehicle distant or remote from the host vehicle within the display frame. However, occasionally changing the display scale makes it difficult to estimate or measure the distance or the angle between the host vehicle and the different vehicle.

SUMMARY

It is an object of the present disclosure to provide a vehicular display apparatus that is provided in a host vehicle and capable of displaying information for recognizing a different vehicle remote or distant from the host vehicle as well as a different vehicle near the host vehicle, providing an easily recognizable mode of displaying the information.

To achieve the above object, according to an aspect of the present disclosure, a vehicular display apparatus in a host vehicle is provided as follows. A display portion is included to have a ring-shaped display area that represents presence of a different vehicle that is remote or distant from the host vehicle. A direction specification processor is included to specify a direction indicating presence of the different vehicle with reference to the host vehicle based on position information about the host vehicle and the different vehicle. A distance specification processor is included to specify a distance between the different vehicle and the host vehicle based on the position information about the host vehicle and the different vehicle. A display control processor is included to display a displayed part of the ring-shaped display area. Herein, the displayed part is determined based on a direction specified by the direction specification processor and has a length that is determined based on a distance specified by the distance specification processor.

Under the above configuration, the vehicular display apparatus can represent a direction of the different vehicle with reference to the host vehicle based on the position (e.g., a central position) of the displayed part of the ring-shaped display area that may be an illuminated part of a light-emitting area, for instance. The vehicular display apparatus can represent a distance between the different vehicle and the host vehicle based on the length (e.g., an arc length) of illuminated part of the light-emitting area. The vehicular display apparatus can use the position and the length of the light-emitting portion of the light-emitting area to provide information about recognition of the different vehicle such as the direction of the different vehicle with reference to the host vehicle and the distance between these vehicles. The vehicular display apparatus differs from a conventional configuration that displays the information about recognition of the different vehicle in accordance with position of the different vehicle. The vehicular display apparatus can provide information to recognize a different vehicle remote or distant from the host vehicle as well as a different vehicle near the host vehicle by providing the information using the position and the length of the light-emitting portion of the light-emitting area. The information can be provided so as to be more easily understandable.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
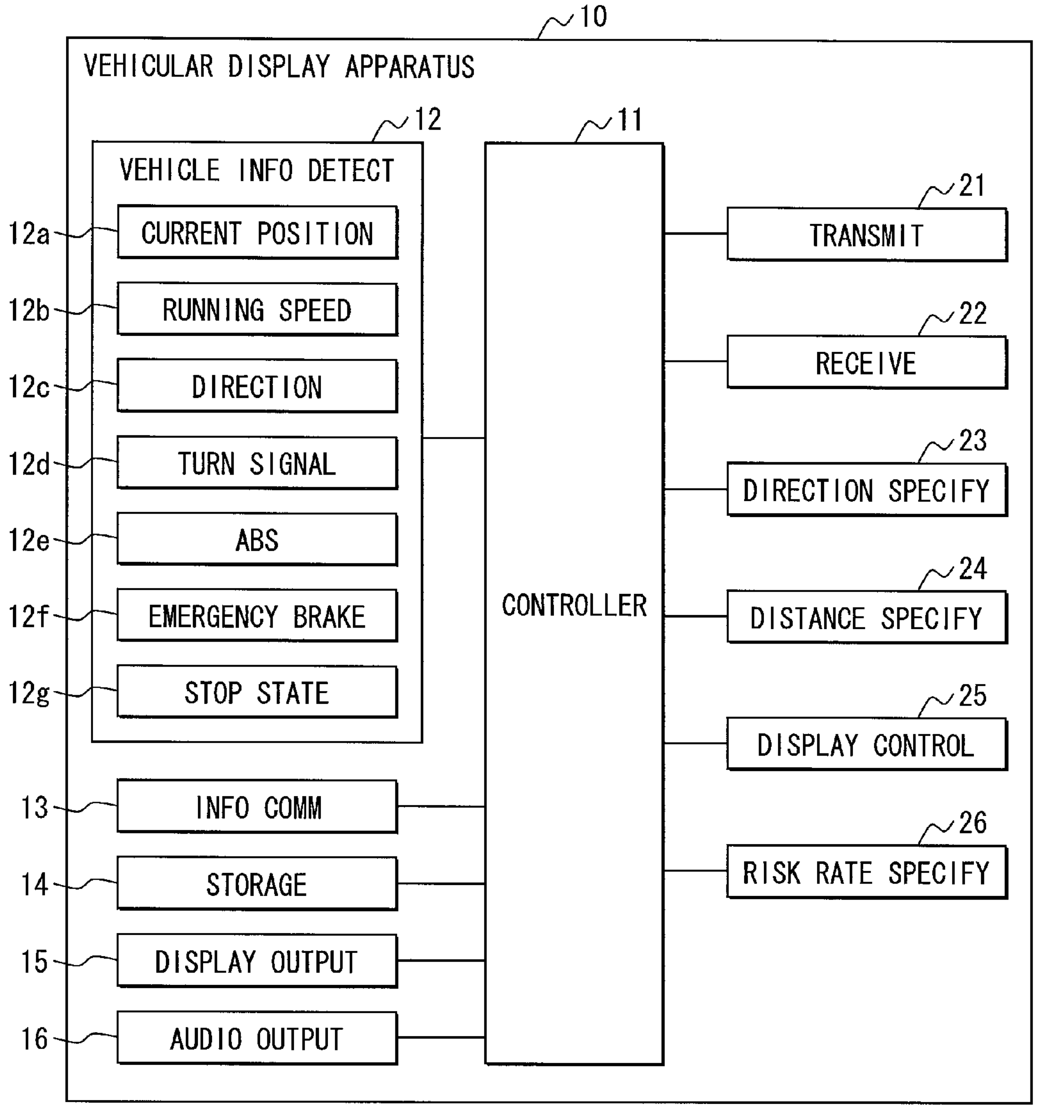
FIG. 1 is a function block diagram schematically showing a configuration of a vehicular display apparatus according to an embodiment of the present disclosure.

An embodiment of the present disclosure will be described with reference to the accompanying drawings. As shown in FIG. 1, a vehicular display apparatus 10 that is provided in a host vehicle includes a controller 11, a vehicle information detection portion 12, an information communication portion 13, a storage portion 14, a display output portion 15, and an audio output portion 16.

The controller is mainly configured as a microcomputer including a CPU, RAM, ROM, and an I/O bus (not shown). The controller 11 controls overall operations of the vehicular display apparatus 10 in accordance with a computer program stored in a storage medium such as the ROM or the storage portion 14. The operations of the vehicular display apparatus 10 include an information communication operation, an information management operation and an alarm display operation to be described later. Although there is no need to be limited, for instance, the controller 11 may execute the program to virtually implement an information transmission processor 21, an information reception processor 22, a direction specification processor 23, a distance specification processor 24, a display control processor 25, and a risk rate specification processor 26 as software. The direction specification processor 23 is equivalent to a direction specification device or means. The distance specification processor 24 is equivalent to a distance specification device or means. The display control processor 25 is equivalent to a display control device or means. The risk rate specification processor 26 is equivalent to a risk rate specification device or means.

The vehicle information detection portion 12 is provided with modules to detect a variety of vehicle information. The modules include a current position detection module 12*a*, a running speed detection module 12*b*, a running direction detection module 12*c*, a turn signal lamp operation state detection module 12*d*, an ABS (Antilock Brake System) operation detection module 12*e*, an emergency brake detection module 12*f*, and a stop state detection module 12*g*.

The current position detection module 12*a* includes a GPS (Global Positioning System) receiver (not shown), for example. Based on a satellite radio wave received from a GPS satellite, the current position detection module 12*a* detects the current position of the host vehicle, that is, a vehicle mounted with the vehicular display apparatus 10. The current position detection module 12*a* outputs current position information that indicates the detected current position. The running speed detection module 12*b* includes a speed sensor (not shown), for example. The running speed detection module 12*b* detects a running speed of the host vehicle and outputs running speed information that indicates the detected running speed. The running direction detection module 12*c* includes a direction sensor or a gyro sensor (not shown), for example. The running direction detection module 12*c* detects a running direction of the host vehicle and outputs running direction information that indicates the detected running direction. The turn signal lamp operation state detection module 12*d* detects operation states of a left turn signal lamp and a right turn signal lamp provided for the host vehicle and outputs turn signal lamp operation state information that indicates one of the detected operation states. The operation states signify that the left turn signal lamp operates, the right turn signal lamp operates, and no turn signal lamp operates.

The ABS operation detection module 12*e* outputs ABS operation information when an ABS apparatus provided for the host vehicle is operated. The information indicates that the ABS apparatus is operated. The emergency brake detection module 12*f* outputs emergency brake operation information when a brake (not shown) provided for the host vehicle is operated and the host vehicle decreases its running speed for a predetermined value or more within a predetermined time. The information indicates that the emergency brake is operated on the host vehicle. The stop state detection module 12*g* outputs vehicle stop information when the host vehicle decreases its running speed to 0 km or a parking brake (not shown) provided for the host vehicle is operated. The information indicates that the host vehicle has stopped.

The information communication portion 13 is equivalent to a communication module that exchanges a variety of information with a vehicular display apparatus mounted on a different vehicle present within a specified distance such as 150 m from the host vehicle. The controller 11 allows the information communication portion 13 to transmit vehicle information about the host vehicle to the different vehicle. The vehicle information detection portion 12 detects the vehicle information such as: the current position information indicating the current position of the host vehicle; the running speed information indicating the running speed of the host vehicle; the running direction information indicating the running direction of the host vehicle; the turn signal lamp operation state information indicating operation states of the turn signal lamps provided for the host vehicle; the ABS operation information indicating that the ABS apparatus is operated on the host vehicle; the emergency brake operation information indicating that the emergency brake is operated on the host vehicle; information including the vehicle stop information indicating that the host vehicle has stopped; and coverage area information indicating the coverage area predetermined for the host vehicle. The controller 11 allows the information communication portion 13 to receive vehicle information about a different vehicle and coverage area information about the different vehicle transmitted from it. A circle centered at the host vehicle or the different vehicle defines the coverage area for each vehicle. The radius of the circle represents the size of the coverage area defined for each vehicle. Specific values are predetermined for the vehicles.

The storage portion 14 is configured as storage media such as a hard disk drive and a memory card or the RAM provided for the controller 11, for example. The storage portion 14 includes a storage area that stores a variety of information such as the vehicle information about the host vehicle and different vehicles. The storage portion 14 stores the vehicle information about a different vehicle in a different vehicle information list. The storage portion 14 includes a display output information storage area and a dangerous vehicle information storage area. The display output information storage area stores information for display output. The dangerous vehicle information storage area stores vehicle information that concerns a different vehicle and is read based on a risk rate. These areas will be described later in more detail.

Figure 2:
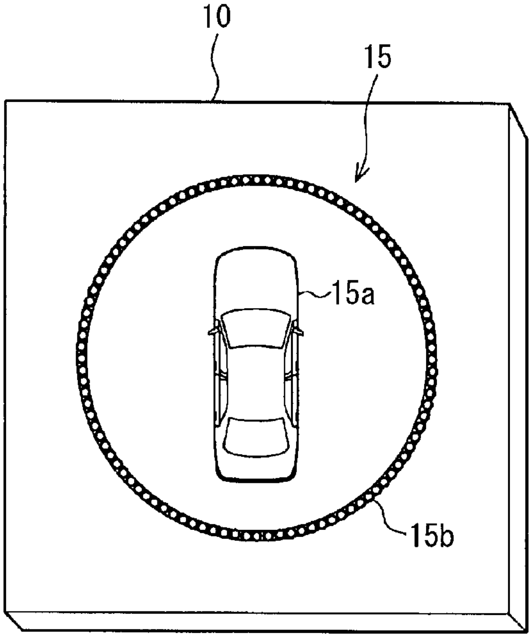
FIG. 2 is a perspective view schematically showing an external view of the vehicular display apparatus.

The display output portion 15 is equivalent to a display portion. As shown in FIG. 2, the display output portion 15 is integrally built into the body of the vehicular display apparatus 10. The display output portion 15 includes a host vehicle mark 15*a* and a light-emitting area 15*b*. The light-emitting area 15*b* is an annular ring-shaped area around the host vehicle mark 15*a*; namely, the light-emitting area 15*b* is circumferentially or, in this case, circularly provided around the host vehicle mark 15*a*. The host vehicle mark 15*a* symbolically represents the host vehicle, that is, the vehicle mounted with the vehicular display apparatus 10. The light-emitting area 15*b* includes circularly arranged light-emitting elements such as LEDs. The light-emitting area 15*b* lights in accordance with a light-emitting instruction signal supplied from the controller 11. The light-emitting area 15*b* thereby notifies presence of a different vehicle using various display modes to be described later in detail. In this case, a vertical direction of the vehicular display apparatus 10 corresponds to a longitudinal direction (i.e., vehicle-length direction) of the host vehicle. A horizontal direction of the vehicular display apparatus 10 corresponds to a lateral direction (i.e., a vehicle-width direction) of the host vehicle. The embodiment has described the display output portion 15 as a mechanical example. Alternatively, the display output portion 15 may be provided as an image displayed on a liquid crystal panel (not shown), for example.

The audio output portion 16 includes a speaker (not shown). The audio output portion 16 outputs audio in accordance with an audio output instruction signal supplied from the controller 11.

The information transmission processor 21 allows the information communication portion 13 to perform an information transmission process that transmits vehicle information about the host vehicle. The controller 11 has a timer (not shown) that counts an information transmission cycle. Each time the timer reaches a specified count value, the controller 11 allows the information transmission processor 21 to cyclically perform the information transmission process. The information transmission processor 21 may be configured to perform the information transmission process uninterruptedly instead of cyclically.

The information reception processor 22 allows the information communication portion 13 to perform an information reception process that receives vehicle information about a different vehicle transmitted from it. After the information reception processor 22 receives the vehicle information about the different vehicle, the controller 11 stores the vehicle information as a different vehicle information list in the storage portion 14.

Based on current position information about the host vehicle and the different vehicle, the direction specification processor 23 performs a direction specification process that specifies an angle corresponding to presence of the different vehicle with reference to the host vehicle. Based on current position information about the host vehicle and the different vehicle, the distance specification processor 24 performs a distance specification process that specifies a distance between the host vehicle and the different vehicle.

Figure 3:
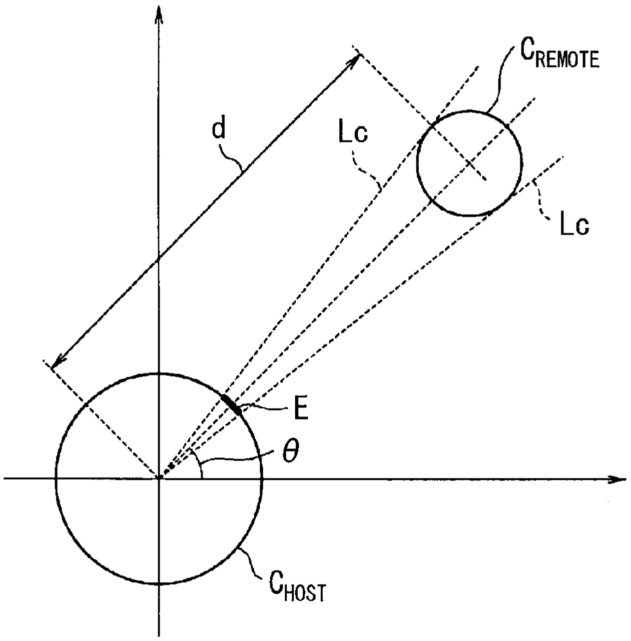
FIG. 3 shows a fixed coordinate system containing circles that represent coverage areas for a host vehicle and a different vehicle remote from the host vehicle.

The display control processor 25 performs a light emission control process as follows. The display control processor 25 displays or illuminates selected part of the light-emitting area 15*b* that corresponds to the direction specified by the direction specification processor 23 and covers the length corresponding to the distance specified by the distance specification processor 24. In other words, the selected part of the light-emitting area 15*b* corresponds to the direction of the different vehicle with reference to the host vehicle and the distance between the host vehicle and the different vehicle. During the light emission control process as shown in FIG. 3, the display control processor 25 places circles $C_{HOST}$ and $C_{REMOTE}$ in the fixed coordinate system whose origin corresponds to the current position of the host vehicle. The circle $C_{HOST}$ represents a coverage area for the host vehicle. The circle $C_{REMOTE}$ represents a coverage area for the different vehicle. In this case, angle θ specifies the direction along which the different vehicle is present with reference to the host vehicle. Distance d specifies the distance between the host vehicle and the different vehicle. The display control processor 25 draws tangent lines Lc from the current position of the host vehicle, that is, from the center of the circle $C_{HOST}$ to the circle $C_{REMOTE}$. The tangent lines Lc divide circle $C_{HOST}$. The divided arc is specified as a light-emitting portion E the light emission control process illuminates. The display control processor 25 uses a specified emission color to illuminate a portion corresponding to the light-emitting portion E of the light-emitting area 15*b*. In this manner, the display control processor 25 uses a specified emission color to illuminate part of the light-emitting area 15*b* that corresponds to the direction specified by the direction specification processor 23 and covers the length associated with or corresponding to the distance specified by the distance specification processor 24. For instance, the distance d between the host vehicle and the different vehicle decreases, the length increases. In other words, the display control processor 25 fixes (i) the center of the illuminated part of the light-emitting area 15*b* based on the direction specified by the direction specification processor 23, and (ii) the arc length or width of the illuminated part based on the distance specified by the distance specification processor 24.

The risk rate specification processor 26 performs a risk rate specification process that specifies a risk rate of the different vehicle in relation to the host vehicle. The risk rate signifies a parameter indicating possibility of the host vehicle colliding with the different vehicle. The host vehicle is more likely to collide with the different vehicle as the risk rate increases. The host vehicle is less likely to collide with the different vehicle as the risk rate decreases. The controller 11 adjusts the components of light's three primary colors, that is, RGB (Red, Green, and Blue), in accordance with the risk rate specified by the risk rate specification processor 26. The controller 11 thereby specifies the emission color for the light-emitting portion E of the light-emitting area 15*b*. The controller 11 increases the R component for the emission color as the risk rate increases. The controller 11 increases the B component for the emission color as the risk rate decreases. The controller 11 includes a timer (not shown) that counts a risk rate determination cycle. Each time the timer reaches a specified count value, the controller 11 allows the risk rate specification processor 26 to cyclically perform the risk rate specification process. Instead of cyclically, the controller 11 may allow the risk rate specification processor 26 to perform the risk rate specification process each time the vehicle information about the different vehicle is received.

With reference to FIGS. 4 through 24B, the following describes the alarm display operation performed by the vehicular display apparatus 10 according to the above-mentioned configuration.

It is noted that a flowchart or the processing of the flowchart in the present application includes sections (also referred to as steps), each of which is represented, for instance, as SA1 or the like. Further, each section can be divided into several sub-sections while several sections can be combined into a single section. Furthermore, each of thus configured sections can be also referred to as a device, means, module, portion, or processor.

Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

Furthermore, the software section may be included in a software program, which may be contained in a non-transitory computer-readable storage media as a program product.

Figure 4:
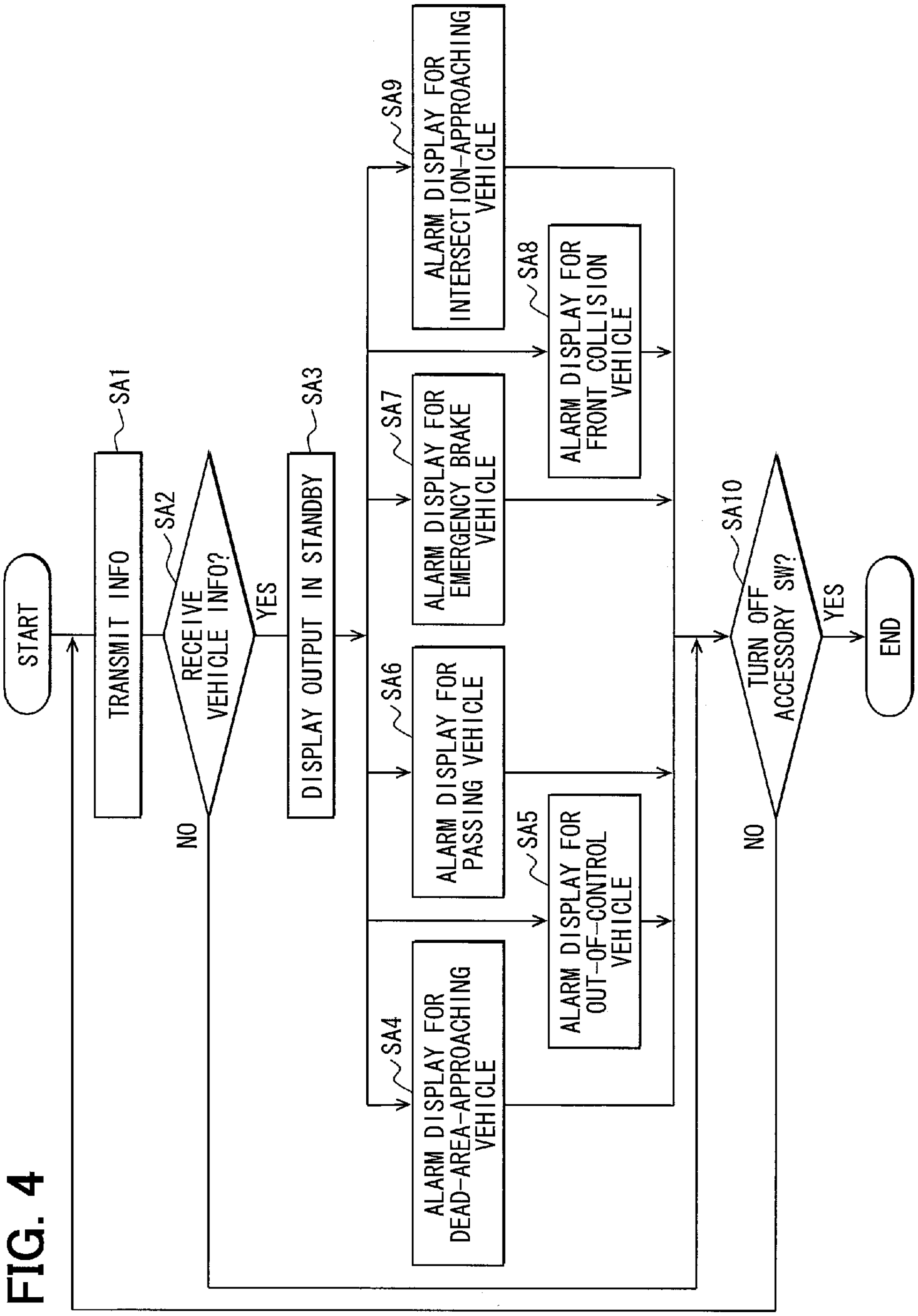
FIG. 4 is a flowchart diagram showing an alarm display operation.

When an accessory switch (not shown) of the host vehicle is turned on, the controller 11 of the vehicular display apparatus 10 performs the information transmission process as shown in FIG. 4 (SA1). The information transmission process transmits the vehicle information about the host vehicle stored in the storage portion 14. The controller 11 monitors whether vehicle information about a different vehicle is received from the different vehicle (SA2). If vehicle information about the different vehicle is not received (NO at SA2), the controller 11 inactivates the light-emitting area 15*b* of the display output portion 15 to turn off all light-emitting elements of the light-emitting area 15*b*. If vehicle information about the different vehicle is received (YES at SA2), the controller 11 confirms that the different vehicle is present around the host vehicle. The controller 11 stores the received vehicle information about the different vehicle as the different vehicle information list in the storage portion 14. The controller 11 makes standby the light-emitting area 15*b* of the display output portion 15 (SA3). All light-emitting elements of the light-emitting area 15*b* light in an initial emission color (i.e., in a standby state). The emission color is initially set to be blue.

After the light-emitting area 15*b* of the display output portion 15 goes standby, the controller 11 concurrently performs the following as an alarm display operation: a dead-area-approaching vehicle alarm display process (SA4), an out-of-control vehicle alarm display process (SA5), a passing vehicle alarm display process (SA6), an emergency brake vehicle alarm display process (SA7), a front collision vehicle alarm display process (SA8), and an intersection-approaching vehicle alarm display process (SA9). The controller 11 repeatedly performs the alarm display operation while the accessory switch of the host vehicle is turned on (NO at SA10). The controller 11 terminates the alarm display operation when the accessory switch turns off (YES at SA10).

The following describes the processes of the alarm display operation in detail.

(1) Dead-Area-Approaching Vehicle Alarm Display Process

Figure 5:
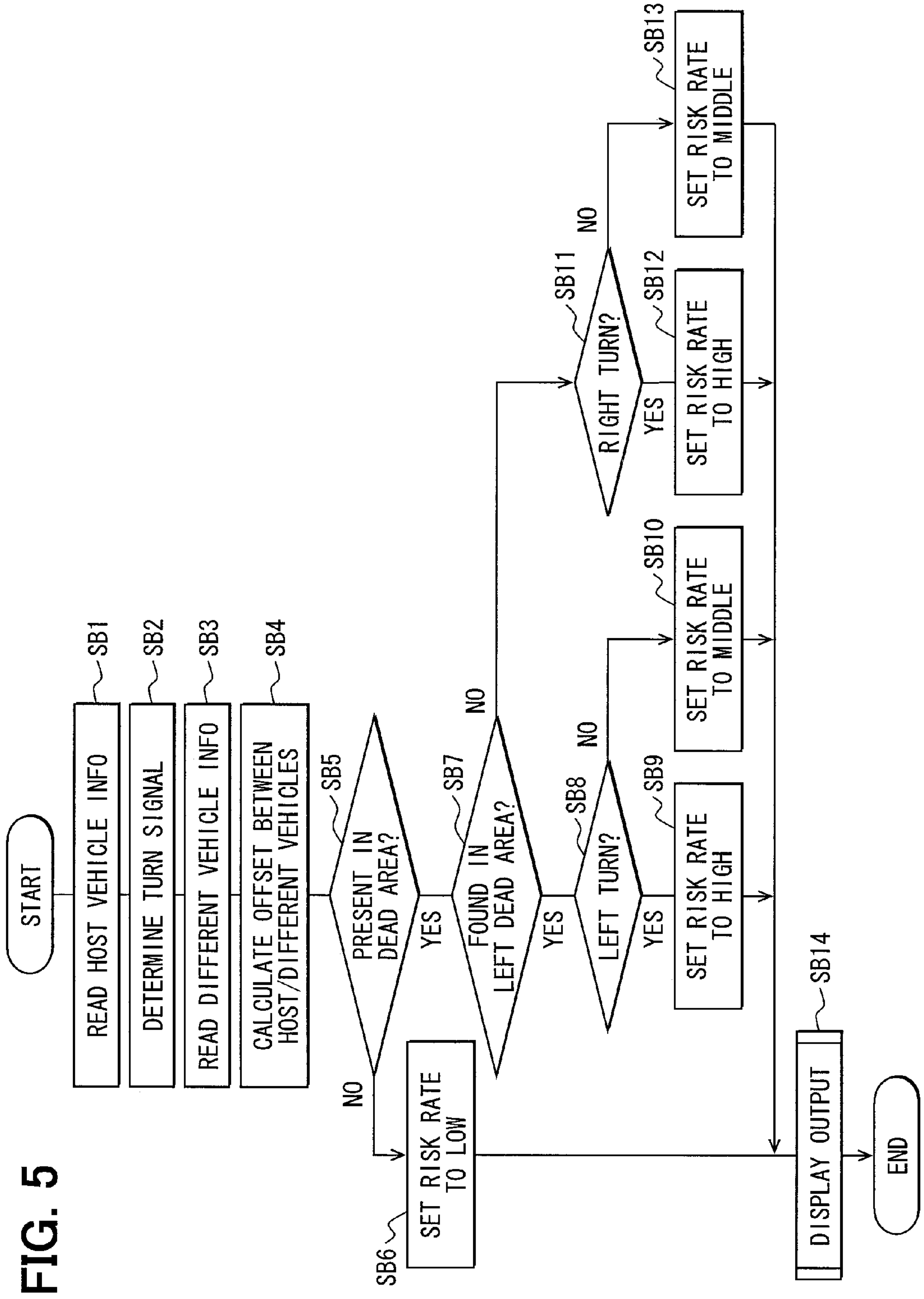
FIG. 5 is a flowchart diagram showing a dead-area-approaching vehicle alarm display process.

FIG. 5 shows the dead-area-approaching vehicle alarm display process. The controller 11 reads vehicle information about the host vehicle from the storage portion 14 (SB1). The controller 11 determines operation states of the turn signal lamps (SB2). That is, the controller 11 verifies operation states of the right and left turn signal lamps based on turn signal lamp operation information contained in the vehicle information about the host vehicle read from the storage portion 14. Specifically, the controller 11 determines whether the right turn signal lamp operates, the left turn signal lamp operates, or no turn signal lamp operates.

Figure 6:
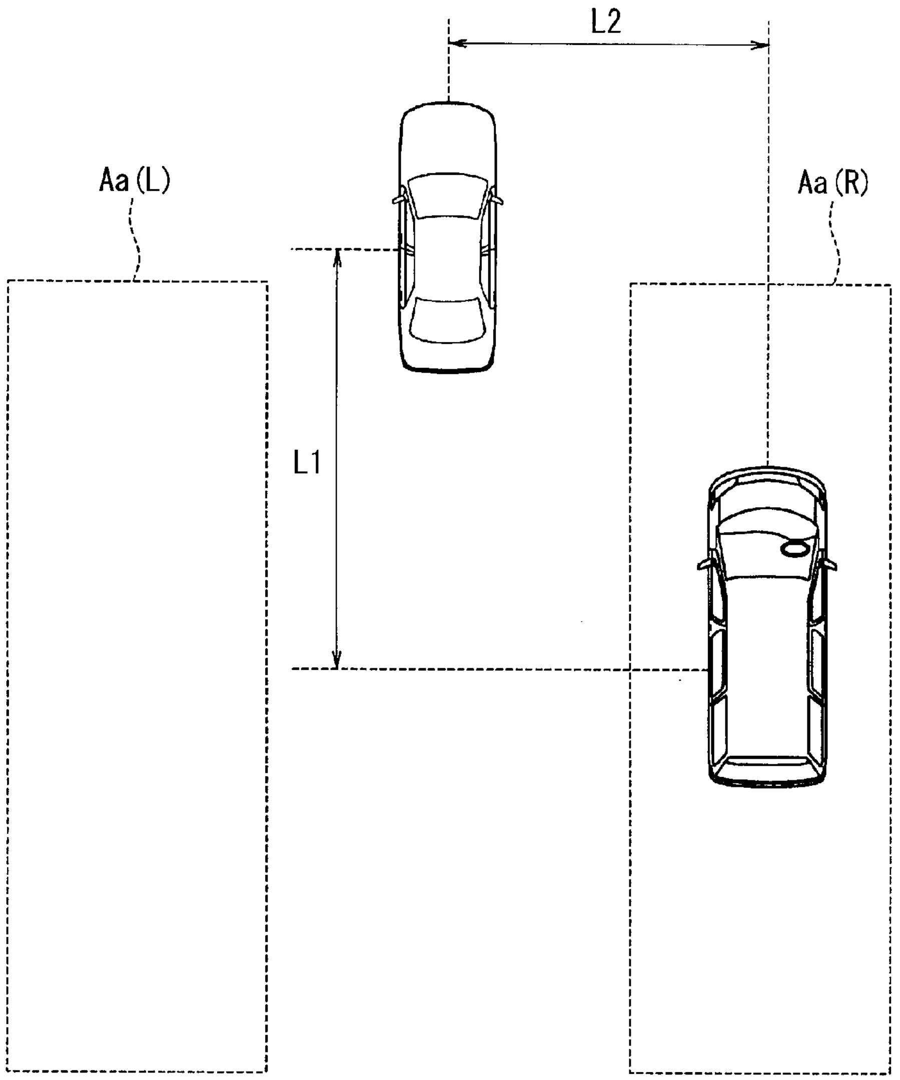
FIG. 6 shows a different vehicle present in a dead area for the host vehicle.

The controller 11 reads the vehicle information about the different vehicle from the different vehicle information list in the storage portion 14 (SB3). The controller 11 calculates an offset between the host vehicle and the different vehicle based on current position information about the host vehicle contained in the vehicle information about the host vehicle and current position information about the different vehicle contained in the vehicle information about the different vehicle (SB4). As shown in FIG. 6, the controller 11 calculates offsets L1 and L2 between the host vehicle and the different vehicle. The offset L1 is found along a longitudinal direction, that is, a running direction of the host vehicle. The offset L2 is found along a lateral direction, that is, a direction orthogonal to the running direction of the host vehicle.

Based on the calculated offsets L1 and L2, the controller 11 determines whether a different vehicle is present in a left dead area Aa(L) or a right dead area Aa(R) for the host vehicle (SB5). The left dead area Aa(L) is settled at the left rear of the host vehicle. The right dead area Aa(R) is settled at the right rear of the host vehicle. The length of the dead area Aa in the longitudinal direction is preferably configured approximately three times as long as the host vehicle in the longitudinal direction. The different vehicle may not be present in the dead area Aa(L) or Aa(R) (NO at SB5). In this case, the controller 11 sets the risk rate for the different vehicle to "low" (SB6).

The different vehicle may be present in the left dead area Aa(L) (YES at SB5 and YES at SB7). In this case, the controller 11 determines whether the left turn signal lamp operates (SB8). If the left turn signal lamp operates (YES at SB8), the controller 11 sets the risk rate for the different vehicle to "high" (SB9). If the left turn signal lamp does not operate (NO at SB8), the controller 11 sets the risk rate for the different vehicle to "middle" (SB10).

The different vehicle may be present in the right dead area Aa(R) (YES at SB5 and NO at SB7). In this case, the controller 11 determines whether the right turn signal lamp operates (SB11). If the right turn signal lamp operates (YES at SB11), the controller 11 sets the risk rate for the different vehicle to high (SB12). If the right turn signal lamp does not operate (NO at SB11), the controller 11 sets the risk rate for the different vehicle to middle (SB13).

The controller 11 sequentially reads vehicle information about different vehicles from the different vehicle information list stored in the storage portion 14. The controller 11 assigns risk rates to different vehicles. The controller 11 assigns risk rates to all different vehicles whose vehicle information is stored in the vehicle information list of the storage portion 14. The controller 11 then performs a display output process (SB14).

Figure 7:
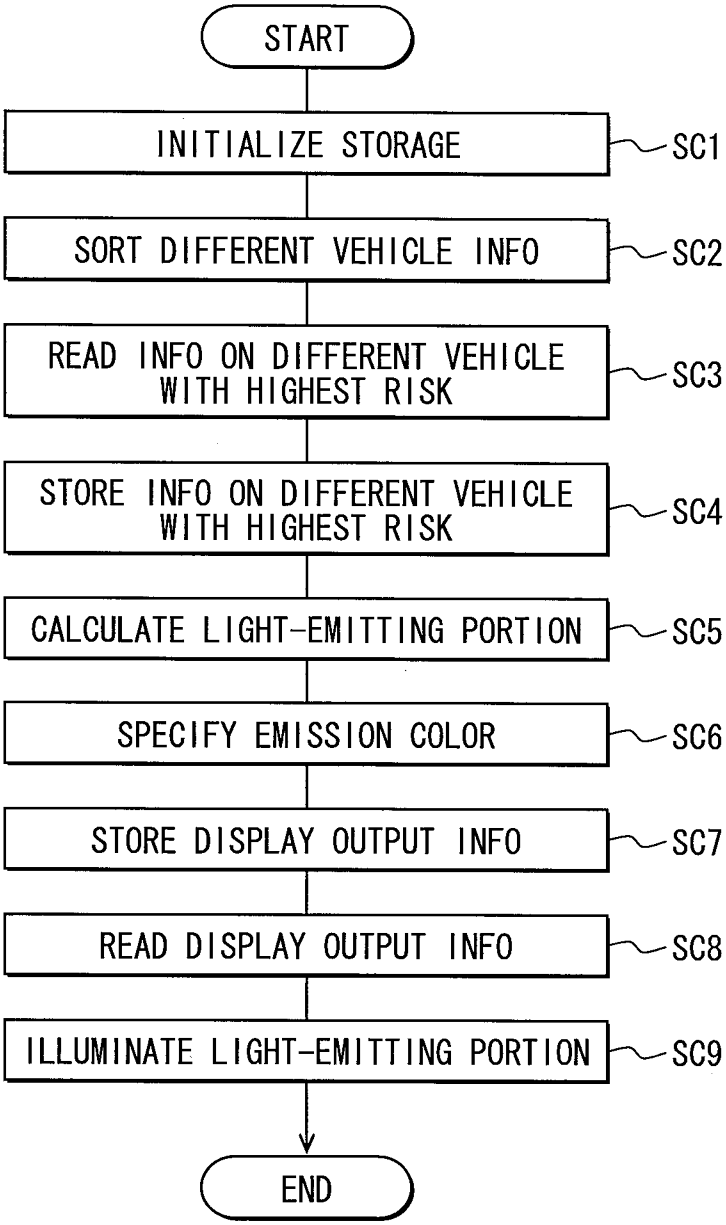
FIG. 7 is a flowchart diagram showing a display output process.

The following describes the display output process with reference to the flowchart in FIG. 7. When the display output process shown in FIG. 7 starts, the controller 11 initializes the display output information storage area and the dangerous vehicle information storage area of the storage portion 14 (SC1). The controller 11 sorts the different vehicle information list in the storage portion 14 (SC2). Specifically, the controller 11 sorts the vehicle information about different vehicles stored in the different vehicle information list in descending order of risk rates assigned to the different vehicles.

The controller 11 reads vehicle information about a different vehicle with the highest risk rate from the sorted different vehicle information list containing different vehicles provided with no light-emitting portion or emission color (SC3). The controller 11 stores the read vehicle information in the dangerous vehicle information storage area (SC4). The controller 11 calculates the light-emitting portion E based on the vehicle information about the host vehicle and the vehicle information about the different vehicle stored in the dangerous vehicle information storage area (SC5). The light-emitting portion E corresponds to part of the light-emitting area 15*b* that is illuminated to indicate the different vehicle. The controller 11 specifies an emission color corresponding to the risk rate for the different vehicle (SC6). If the risk rate is high, the controller 11 specifies the emission color as red indicating alarm. If the risk rate is middle, the controller 11 specifies the emission color as yellow indicating attention. If the risk rate is low, the controller 11 specifies the emission color as green indicating safety. The controller 11 stores display output information in the display output information storage area of the storage portion 14 (SC7). The display output information contains light-emitting portion information indicating the calculated light-emitting portion E and emission color information identifying the specified emission color.

As described above, the controller 11 reads the vehicle information about different vehicles from the different vehicle information list in the storage portion 14 in descending order of risk rates assigned to the different vehicles. The controller 11 generates the display output information for each of different vehicles and stores the generated information in the display output information storage area of the storage portion 14. The controller 11 generates the display output information for all the different vehicles whose vehicle information is stored in the different vehicle information list of the storage portion 14. The controller 11 stores the generated display output information in the display output information storage area of the storage portion 14. The controller 11 then reads the display output information about the different vehicle with the highest risk rate from the display output information about different vehicles stored in the display output information storage area (SC8). Based on the display output information, the controller 11 illuminates the light-emitting portion E in the emission color (SC9). The light-emitting portion E belongs to the light-emitting area 15*b* of the display output portion 15 and corresponds to light-emitting portion information contained in the display output information. The emission color corresponds to the emission color information contained in the display output information. The controller 11 may read the display output information about the other different vehicles as well as the different vehicle with the highest risk rate from the display output information about different vehicles stored in the display output information storage area. The controller 11 may illuminate the light-emitting area 15*b* of the display output portion 15 based on the read display output information.

As described above, the dead-area-approaching vehicle alarm display process can allow the display output portion 15 to easily notify the different vehicle with the highest risk rate out of different vehicles around the host vehicle. In this case, the different vehicle with the highest risk rate is present in the dead area toward which the host vehicle is going to change the lane. The direction of the light-emitting portion E in the light-emitting area 15*b* represents the direction in which the different vehicle is present. The length thereof represents the distance to the different vehicle. The emission color thereof represents the risk rate for the different vehicle.

The controller 11 may allow a speaker (not shown) to generate an alarm sound in response to the display output using illumination of the light-emitting area 15*b*. In this case, the alarm sound may use different patterns according to the risk rates for different vehicles. As the risk rate increases, for example, the alarm sound may be preferably output in shorter cycles or louder.

Figure 8C:
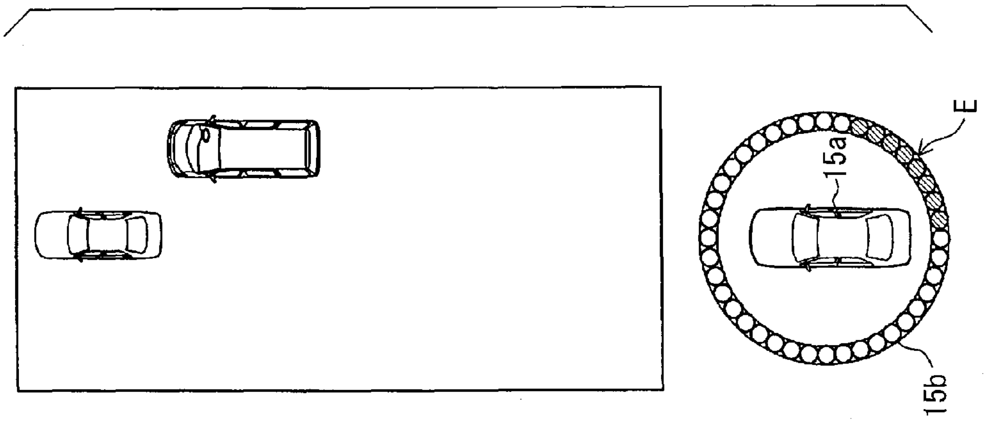
FIGS. 8A, 8B, 8C exemplify situations where the dead-area-approaching vehicle alarm display process is applicable.
Figure 8B:
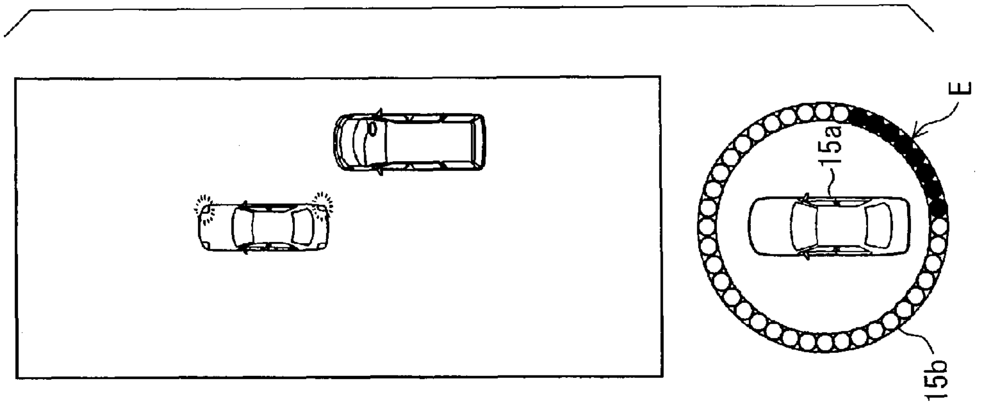
Figure 8A:
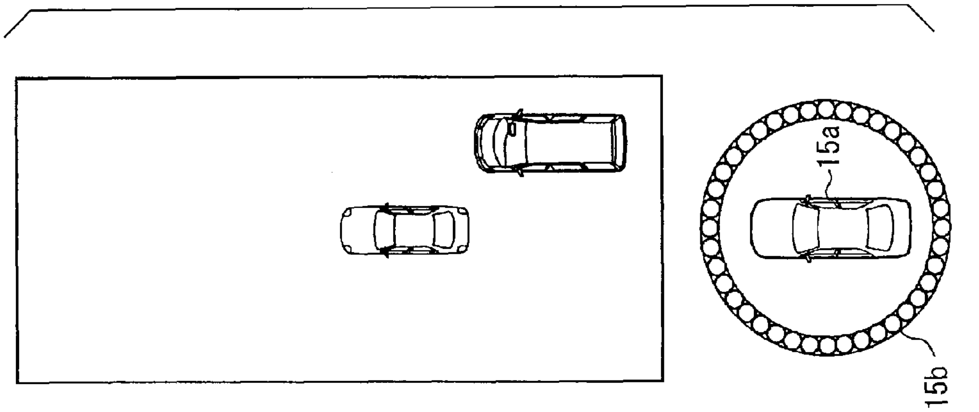

FIGS. 8A, 8B, 8C exemplify situations where the dead-area-approaching vehicle alarm display process is applicable. In FIG. 8A, the controller 11 receives the vehicle information about a different vehicle. The controller 11 then lights the inactive light-emitting area 15*b* in blue as the initial emission color. The controller 11 thereby notifies that a different vehicle is present around the host vehicle. White circles in FIG. 8A represent that the light-emitting area 15*b* lights in blue.

As shown in FIG. 8B, the different vehicle is present in the right dead area Aa(R) to the right of the host vehicle and the host vehicle lights the right turn signal lamp. Accordingly, the controller 11 sets the risk rate for the different vehicle to high. The controller 11 lights the light-emitting portion E of the light-emitting area 15*b* in red indicating the alarm. The vehicular display apparatus 10 thereby notifies that the different vehicle with a very high risk rate is present around the host vehicle, or to the right rear of the host vehicle in this case. Black circles in FIG. 8B represent that the light-emitting portion E of the light-emitting area 15*b* lights in red.

As shown in FIG. 8C, the different vehicle is present in the right dead area Aa(R) for the host vehicle and the right turn signal lamp of the host vehicle does not operate. In this case, the vehicular display apparatus 10 sets the risk rate for the different vehicle to middle. The vehicular display apparatus 10 lights the light-emitting portion E of the light-emitting area 15*b* in yellow indicating the attention. The vehicular display apparatus 10 thereby notifies that the different vehicle with a relatively high risk rate is present around the host vehicle, or to the right rear of the host vehicle in this case. Shaded circles in FIG. 8C represent that the light-emitting portion E of the light-emitting area 15*b* lights in yellow.

(2) Out-of-Control Vehicle Alarm Display Process

Figure 9:
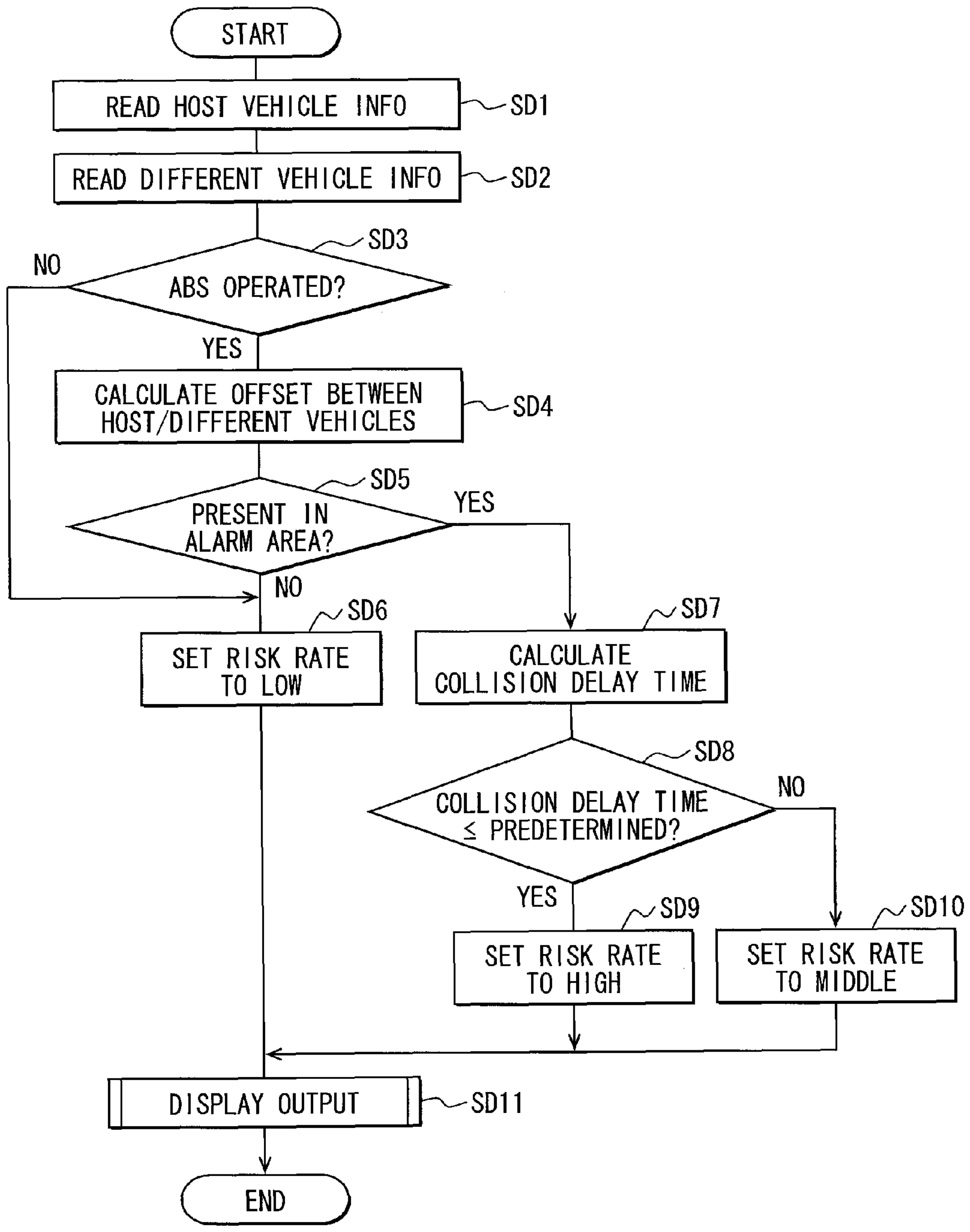
FIG. 9 is a flowchart diagram showing an out-of-control vehicle alarm display process.

FIG. 9 shows the out-of-control vehicle alarm display process. The controller 11 reads vehicle information about the host vehicle from the storage portion 14 (SD1). The controller 11 reads vehicle information about the different vehicle from the storage portion 14 (SD2). The controller 11 determines whether the read vehicle information about different vehicle contains the ABS operation information (SD3).

Figure 10:
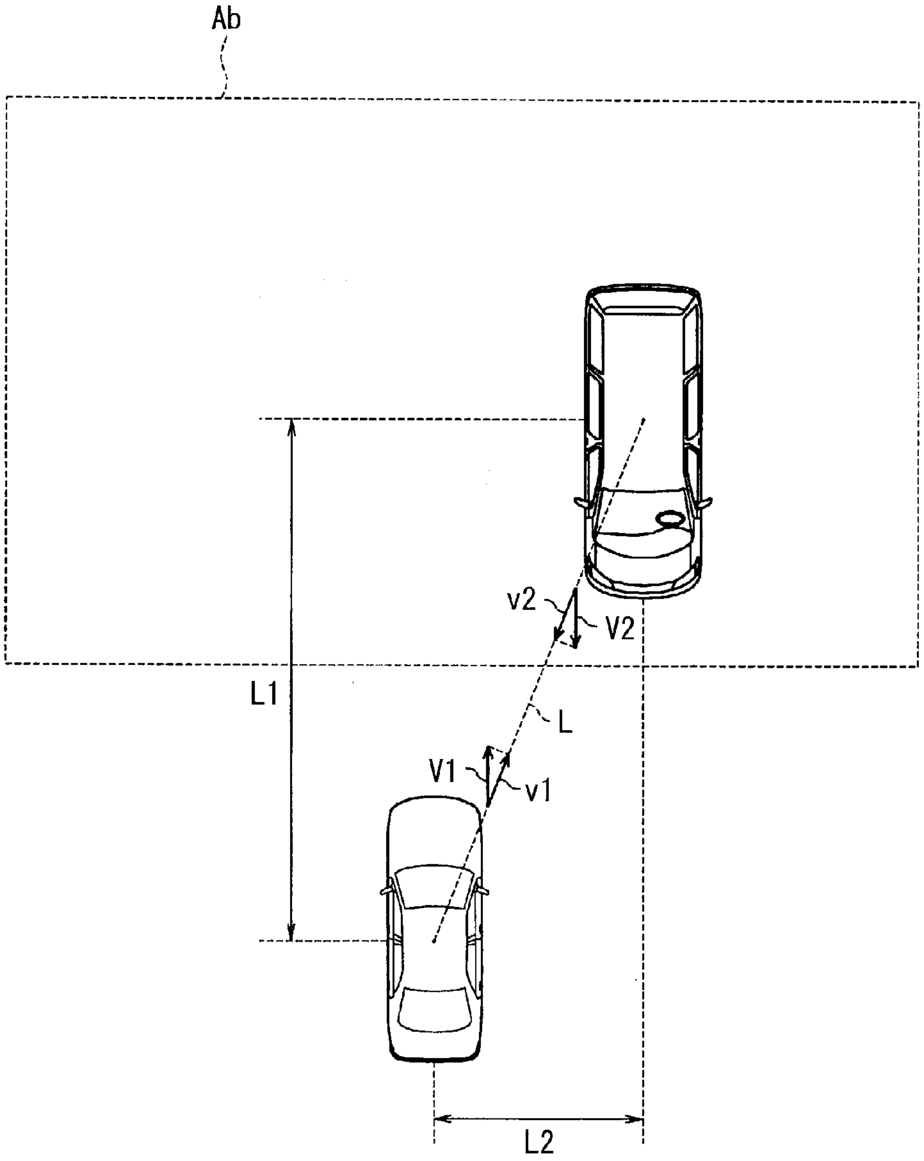
FIG. 10 shows a different vehicle present in an out-of-control vehicle alarm area for the host vehicle.

If the read vehicle information about different vehicle contains the ABS operation information (YES at SD3), the controller 11 calculates an offset L1 in the longitudinal direction and an offset L2 in the lateral direction between the host vehicle and the different vehicle as shown in FIG. 10 based on the current position information about the host vehicle and the different vehicle (SD4). The current position information about the host vehicle is contained in the vehicle information about the host vehicle. The current position information about the different vehicle is contained in the vehicle information about the different vehicle. Based on the calculated offsets L1 and L2, the controller 11 determines whether a different vehicle is present in an out-of-control vehicle alarm area Ab for the host vehicle (SD5). In this case, the out-of-control vehicle alarm area Ab ranges from the left front to the right front of the host vehicle. If the different vehicle is not present in the out-of-control vehicle alarm area Ab (NO at SD5), the controller 11 sets the risk rate for the different vehicle to low (SD6). If the vehicle information (read at SD2) about different vehicle does not contain the ABS operation information (NO at SD3), the controller 11 proceeds to SD6 and sets the risk rate for the different vehicle to low.

If the different vehicle is present in the out-of-control vehicle alarm area Ab (YES at SD5), the controller 11 calculates collision delay time (SD7) based on the current position information, the running speed information, and the running direction information about the different vehicle and the host vehicle. The current position information, the running speed information, and the running direction information about the different vehicle are contained in the vehicle information about the different vehicle. The collision delay time is estimated to elapse until the host vehicle and the different vehicle collide. For example, the collision delay time can be calculated as follows. As shown in FIG. 10, the controller 11 draws a line L between the current position of the host vehicle and the current position of the different vehicle. The controller 11 projects velocity component v1 of velocity vector V1 for the host vehicle onto the line L. The controller 11 projects velocity component v2 of velocity vector V1 for the different vehicle onto the line L. The controller 11 finds a difference between the velocity components v1 and v2, that is, a relative velocity between the host vehicle and the different vehicle. The controller 11 divides a distance corresponding to the line L by the relative velocity to find the collision delay time.

After calculating the collision delay time, the controller 11 compares the calculated collision delay time with a predetermined time (SD8). Any value can be specified as the predetermined time. If the collision delay time is shorter than or equal to the predetermined time (YES at SD8), the controller 11 sets the risk rate for the different vehicle to high (SD9). If the collision delay time is longer than the predetermined time (NO at SD8), the controller 11 sets the risk rate for the different vehicle to middle (SD10).

As described above, the controller 11 sequentially reads the vehicle information about different vehicles stored in the different vehicle information list of the storage portion 14. If the read vehicle information contains the ABS operation information, the controller 11 assumes the corresponding different vehicle to be an out-of-control vehicle and sets its risk rate. The controller 11 assigns risk rates to all out-of-control vehicles whose vehicle information is stored in the different vehicle information list of the storage portion 14. The controller 11 then performs a display output process (SD11). This display output process has the same contents as those of the display output process at SB14 of the dead-area-approaching vehicle alarm display process described above.

As described above, the out-of-control vehicle alarm display process can allow the display output portion 15 to easily notify the different vehicle with the highest risk rate out of different vehicles around the host vehicle. In this case, the different vehicle with the highest risk rate is equivalent to an out-of-control vehicle that is present in the alarm area for the host vehicle. The direction of the light-emitting portion E in the light-emitting area 15*b* represents the direction in which the out-of-control vehicle is present. The length thereof represents the distance to the out-of-control vehicle. The emission color thereof represents the risk rate for the out-of-control vehicle. The controller 11 may allow a speaker (not shown) to generate an alarm sound in response to the display output using illumination of the light-emitting area 15*b*.

Figure 11A:
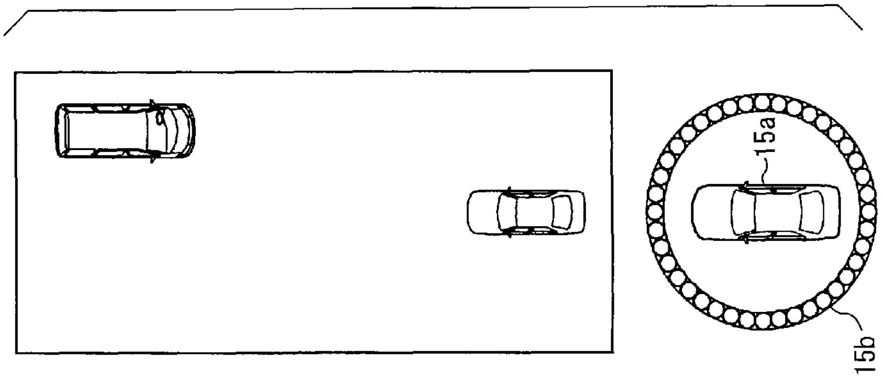
FIGS. 11A, 11B, 11C exemplify situations where the out-of-control vehicle alarm display process is applicable.
Figure 11B:
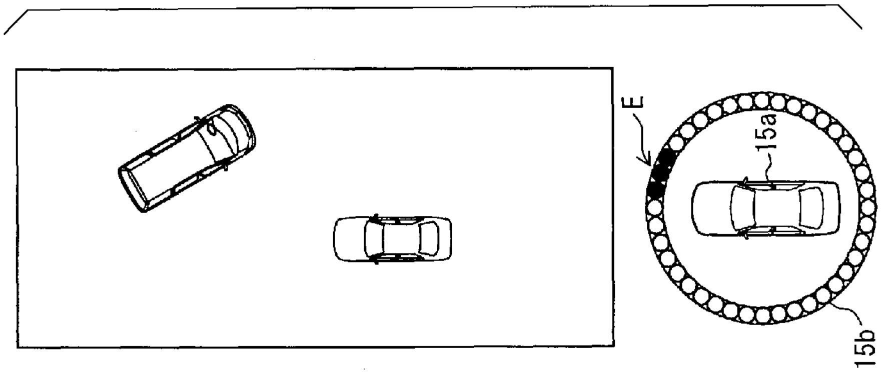
Figure 11C:
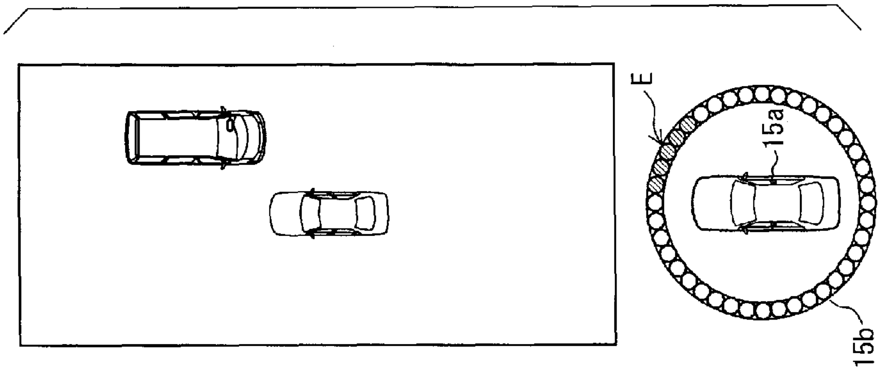

FIGS. 11A, 11B, 11C exemplify situations where the out-of-control vehicle alarm display process is applicable. In FIG. 11A, the controller 11 receives the vehicle information about a different vehicle. The controller 11 then lights the inactive light-emitting area 15*b* in blue as the initial emission color. The controller 11 thereby notifies that a different vehicle is present around the host vehicle. As shown in FIG. 11B, the different vehicle is present in the alarm area Ab for the host vehicle and operates the ABS apparatus to lose the running control. Accordingly, the controller 11 sets the risk rate for the different vehicle to high. The controller 11 lights the light-emitting portion E of the light-emitting area 15*b* in red indicating the alarm. The vehicular display apparatus 10 thereby notifies that the different vehicle with a very high risk rate is present around the host vehicle. In this case, the vehicular display apparatus 10 notifies that the out-of-control vehicle operates the ABS apparatus and is present to the left front of the host vehicle. If the ABS apparatus becomes in an inactivated state on the out-of-control vehicle, the vehicular display apparatus 10 sets the risk rate for the out-of-control vehicle to middle as shown in FIG. 11C. The vehicular display apparatus 10 lights the light-emitting portion E of the light-emitting area 15*b* in yellow indicating the attention. The vehicular display apparatus 10 thereby notifies that the different vehicle with a relatively high risk rate is present around the host vehicle, or to the left front of the host vehicle in this case.

(3) Passing Vehicle Alarm Display Process

Figure 12:
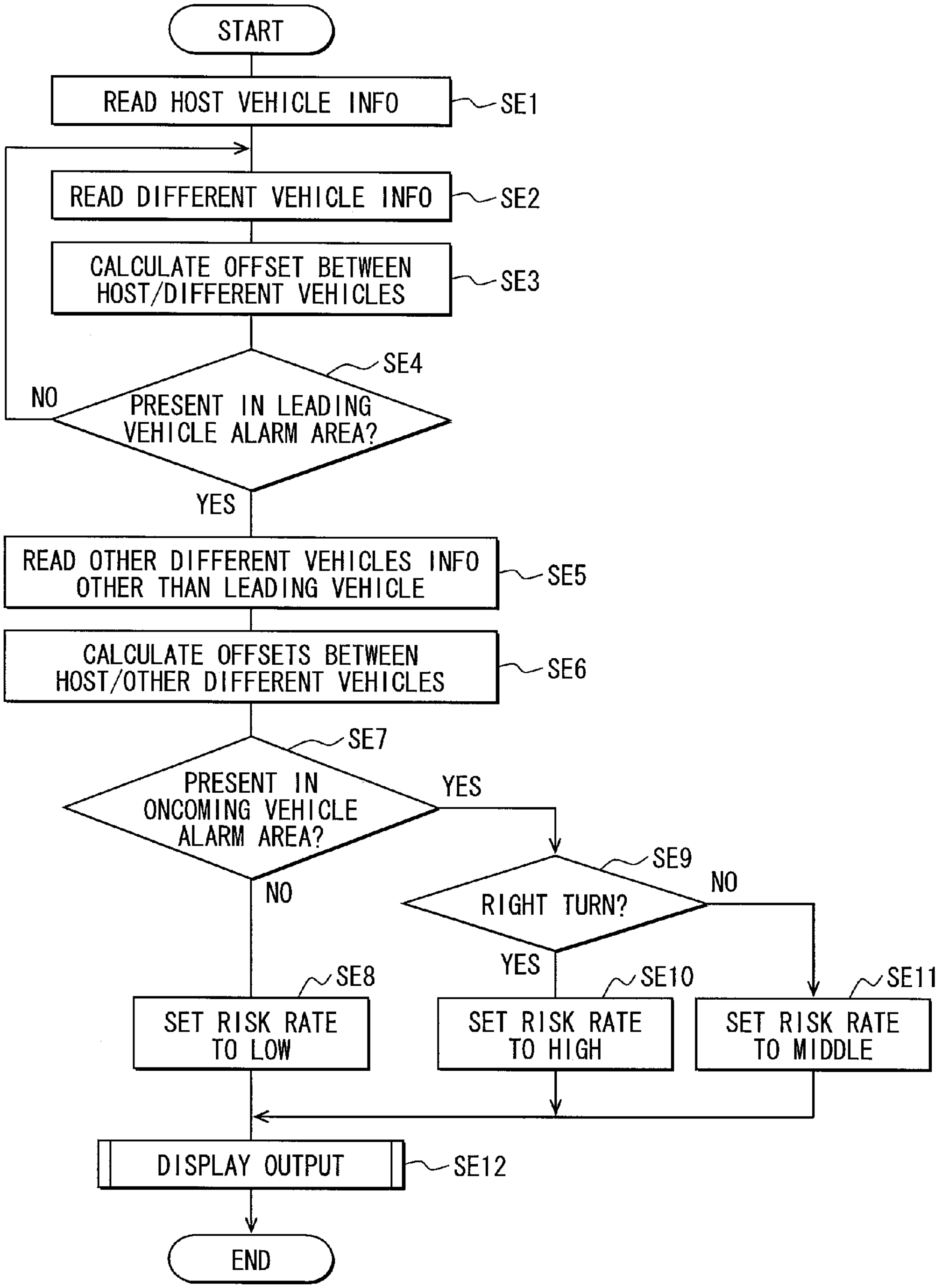
FIG. 12 is a flowchart diagram showing a passing vehicle alarm display process.
Figure 13:
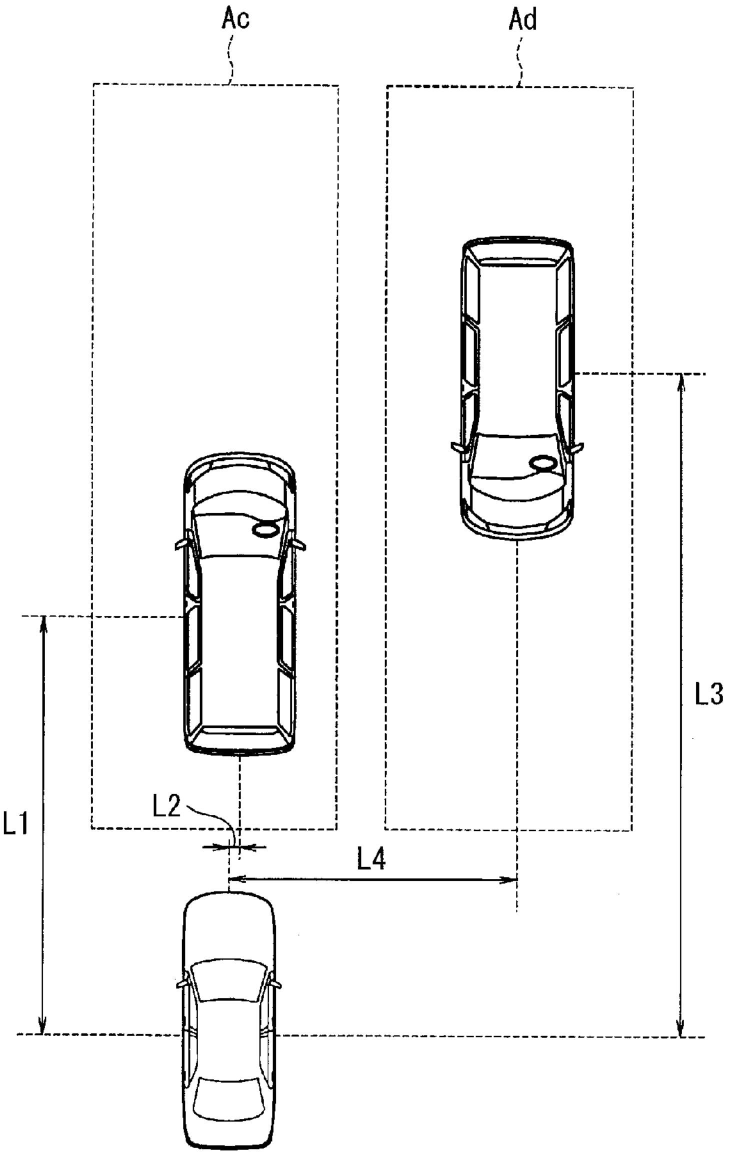
FIG. 13 shows that a leading vehicle is present in a leading vehicle alarm area for the host vehicle and an oncoming vehicle is present in an oncoming vehicle alarm area for the hot vehicle.

FIG. 12 shows the passing vehicle alarm display process. The controller 11 reads vehicle information about the host vehicle from the storage portion 14 (SE1). The controller 11 reads vehicle information about the different vehicle from the storage portion 14 (SE2). As shown in FIG. 13, the controller 11 calculates an offset L1 in the longitudinal direction and an offset L2 in the lateral direction between the host vehicle and the different vehicle based on the current position information about the host vehicle and the different vehicle (SE3). The current position information about the host vehicle is contained in the vehicle information about the host vehicle. The current position information about the different vehicle is contained in the vehicle information about the different vehicle. Based on the calculated offsets L1 and L2, the controller 11 determines whether a different vehicle is present in a leading vehicle alarm area Ac for the host vehicle (SE4). In this case, the leading vehicle alarm area Ac is specified ahead of the host vehicle along its running direction. If no different vehicle is present in the leading vehicle alarm area Ac (NO at SE4), the controller 11 determines that no leading vehicle is present ahead of the host vehicle. The controller 11 returns to SE2 and reads vehicle information about the next different vehicle.

If a different vehicle is present in the leading vehicle alarm area Ac (YES at SE4), the controller 11 assumes the different vehicle to be a leading vehicle. In addition, the controller 11 reads vehicle information about different vehicles other than the leading vehicle from storage portion 14 (SE5). The controller 11 sets the risk rate for the leading vehicle to middle. As shown in FIG. 13, the controller 11 calculates an offset L3 in the longitudinal direction and an offset L4 in the lateral direction between the host vehicle and a different vehicle other than the leading vehicle based on the current position information about the host vehicle and the different vehicle (SE6). The current position information about the host vehicle is contained in the vehicle information about the host vehicle. The current position information about the different vehicle is contained in the vehicle information about the different vehicle other than the leading vehicle. Based on the calculated offsets L3 and L4, the controller 11 determines whether a different vehicle other than the leading vehicle is present in an oncoming vehicle alarm area Ad for the host vehicle (SE7). In this case, the oncoming vehicle alarm area Ad is specified to the left front of the host vehicle. If the different vehicle is not present in the oncoming vehicle alarm area Ad (NO at SE7), the controller 11 sets the risk rate for the different vehicle to low (SE8).

If the different vehicle is present in the oncoming vehicle alarm area Ad (YES at SE7), the controller 11 determines whether the right turn signal lamp operates (SE9). Tithe right turn signal lamp operates (YES at SE9), the controller 11 sets the risk rate for the different vehicle to high (SE10). If the right turn signal lamp does not operate (NO at SE9), the controller 11 sets the risk rate for the different vehicle to middle (SE11).

As described above, the controller 11 sequentially reads vehicle information about different vehicles stored in the different vehicle information list of the storage portion 14. The controller 11 identifies an oncoming vehicle if it is present in the oncoming vehicle alarm area Ad and is not the leading vehicle for the host vehicle. The controller 11 assigns an appropriate risk rate to the oncoming vehicle. The controller 11 assigns risk rates to all oncoming vehicles whose vehicle information is stored in the different vehicle information list of the storage portion 14. The controller 11 then performs a display output process (SE12).

The display output process has almost the same contents as those of the above-mentioned display output process (SB14). Unlike SB14, the controller 11 uses a first light-emitting portion E1 for the leading vehicle. The controller 11 uses a second light-emitting portion E2 for the oncoming vehicle. The controller 11 uses yellow indicating the attention as the emission color for the first light-emitting portion. The controller 11 uses red indicating the alarm as the emission color for the second light-emitting portion.

As described above, the passing vehicle alarm display process can allow the display output portion 15 to easily notify the different vehicle with the highest risk rate out of different vehicles around the host vehicle. In this case, the different vehicle with the highest risk rate signifies an oncoming vehicle present in the oncoming vehicle alarm area specified toward the right front of the host vehicle so that the host vehicle can change the lane in order to pass a leading vehicle. It also signifies a leading vehicle present in the leading vehicle alarm area specified along the running direction of the host vehicle ahead of the same. The directions of the light-emitting portions E1 and E2 in the light-emitting area 15*b* represent the directions in which the oncoming vehicle and the leading vehicle are present. The lengths thereof represent the distances to the oncoming vehicle and the leading vehicle. The emission colors thereof represent the risk rates for the oncoming vehicle and the leading vehicle. The controller 11 may allow a speaker (not shown) to generate an alarm sound in response to the display output using illumination of the light-emitting area 15*b*.

Figure 14C:
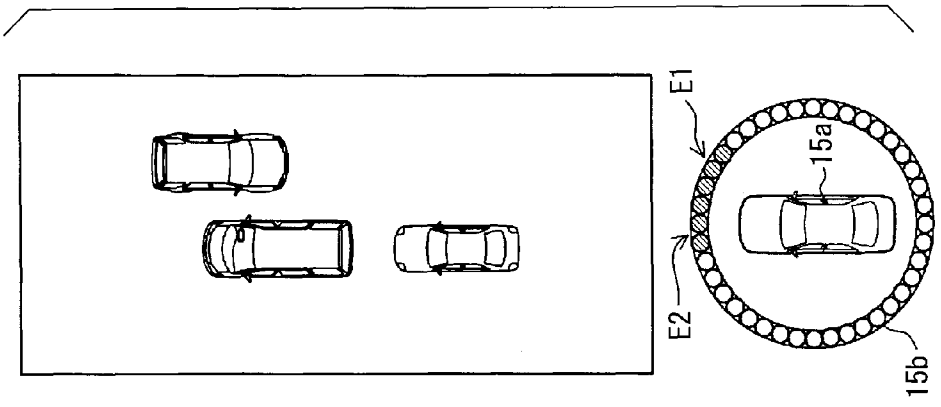
FIGS. 14A, 14B, 14C exemplify situations where the passing vehicle alarm display process is applicable.
Figure 14B:
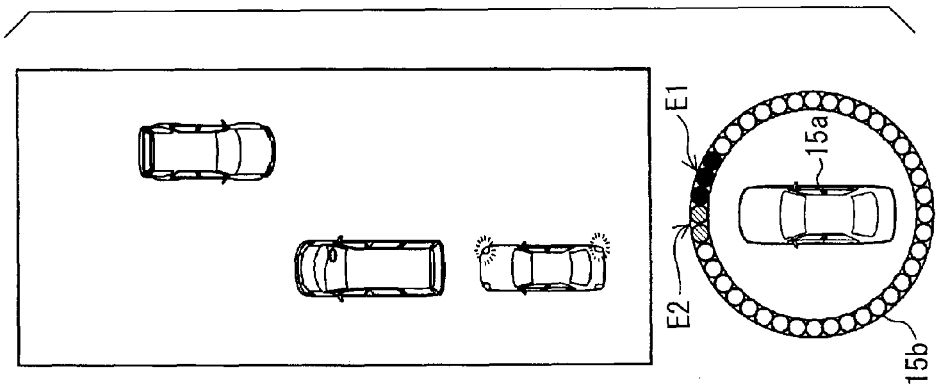
Figure 14A:
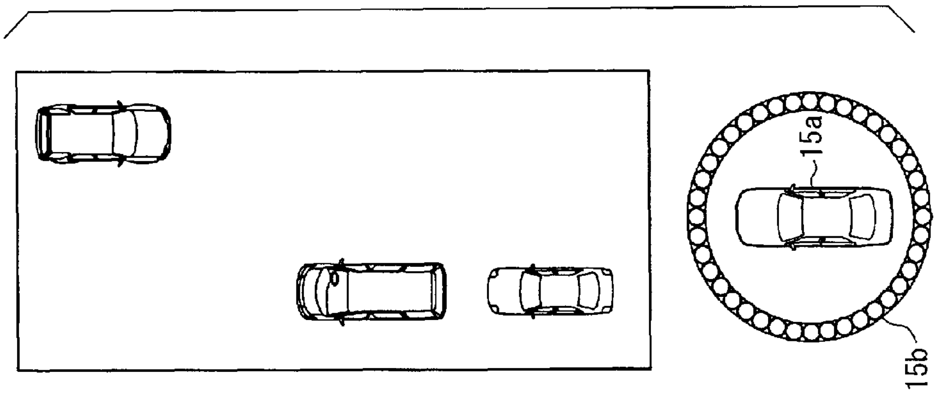

FIGS. 14A, 14B, 14C exemplify situations where the passing vehicle alarm display process is applicable. In FIG. 14A, the controller 11 receives the vehicle information about a different vehicle. The controller 11 then lights the inactive light-emitting area 15*b* in blue as the initial emission color. The controller 11 thereby notifies that a different vehicle is present around the host vehicle. As shown in FIG. 14B, a leading vehicle is present in the leading vehicle alarm area Ac specified along the running direction of the host vehicle ahead of the same. In addition, an oncoming vehicle is present in the oncoming vehicle alarm area Ad specified toward the right front of the host vehicle so that the host vehicle can change the lane in order to pass a leading vehicle. The oncoming vehicle corresponds to a light-emitting portion E1 of the light-emitting area 15*b*. The controller 11 lights the light-emitting portion E1 in red indicating the alarm. The leading vehicle corresponds to a light-emitting portion E2 of the light-emitting area 15*b*. The controller 11 lights the light-emitting portion E2 in yellow indicating the attention. The controller 11 thereby notifies that the oncoming vehicle as the different vehicle with a very high risk rate is present around the host vehicle or to the right front of the same in this case and that the leading vehicle as the different vehicle with a relatively high risk rate is present ahead. When the right turn signal lamp of the host vehicle is inactivated, the controller 11 lights the light-emitting portion E1 of the light-emitting area 15*b* in yellow indicating the attention. The vehicular display apparatus 10 thereby notifies that the different vehicle with a relatively high risk rate is present around the host vehicle, or to the right front of the same in this case.

(4) Emergency Brake Vehicle Alarm Display Process

Figure 15:
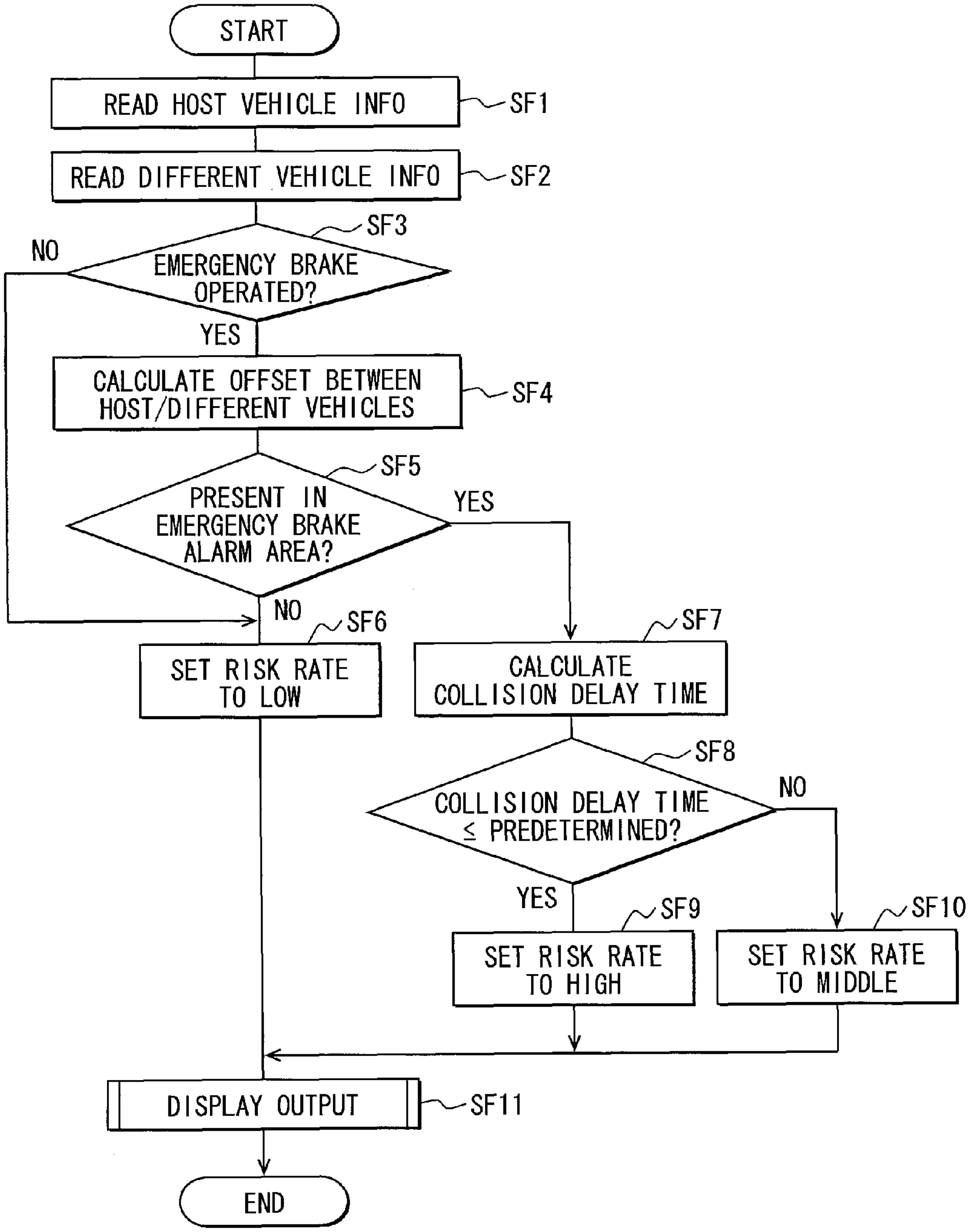
FIG. 15 is a flowchart diagram showing an emergency brake vehicle alarm display process.

FIG. 15 shows the emergency brake vehicle alarm display process. The controller 11 reads vehicle information about the host vehicle from the storage portion 14 (SF1). The controller 11 reads vehicle information about the different vehicle from the storage portion 14 (SF2). The controller 11 determines whether the read vehicle information about different vehicles contains emergency brake operation information (SF3).

Figure 16:
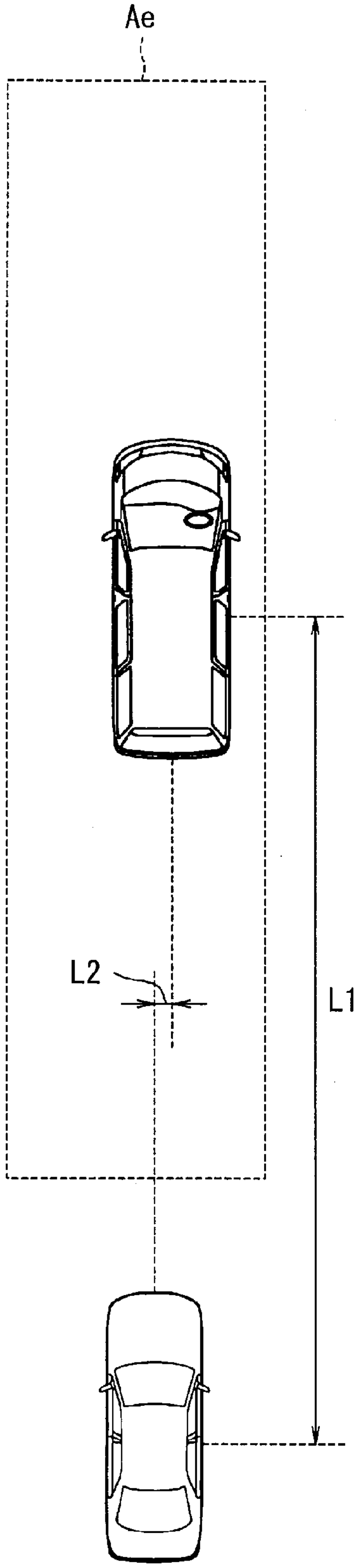
FIG. 16 shows a different vehicle present in an emergency brake alarm area for the host vehicle.

The read vehicle information about different vehicles may contain the emergency brake operation information (YES at SF3). In this case, the controller 11 calculates an offset L1 in the longitudinal direction and an offset L2 in the lateral direction between the host vehicle and the different vehicle as shown in FIG. 16 based on the current position information about the host vehicle and the different vehicle (SF4). The current position information about the host vehicle is contained in the vehicle information about the host vehicle. The current position information about the different vehicle is contained in the vehicle information about the different vehicle. Based on the calculated offsets L1 and L2, the controller 11 determines whether a different vehicle is present in an emergency brake alarm area Ae for the host vehicle (SF5). The emergency brake alarm area Ae is specified ahead of the host vehicle and is longer than the above-mentioned leading vehicle alarm area along the running direction of the host vehicle. If the different vehicle is not present in the emergency brake alarm area Ae (NO at SF5), the controller 11 sets the risk rate for the different vehicle to low (SF6). If the vehicle information (read at SF2) about different vehicle does not contain the emergency brake operation information (NO at SF3), the controller 11 proceeds to SF6 and sets the risk rate for the different vehicle to low.

If the different vehicle is present in the emergency brake alarm area Ae (YES at SF5), the controller 11 calculates collision delay time (SF7) based on the current position information, the running speed information, and the running direction information about the different vehicle and the host vehicle. The current position information, the running speed information, and the running direction information about the different vehicle are contained in the vehicle information about the different vehicle. The collision delay time can be found using the same arithmetic processing as that performed at SD7 described above.

After calculating the collision delay time, the controller 11 compares the collision delay time with a predetermined time (SF8). Any value can be specified as the predetermined time. If the collision delay time is shorter than or equal to the predetermined time (YES at SF8), the controller 11 sets the risk rate for the different vehicle to high (SF9). If the collision delay time is longer than the predetermined time (NO at SF8), the controller 11 sets the risk rate for the different vehicle to middle (SF10).

As described above, the controller 11 sequentially reads the vehicle information about different vehicles stored in the different vehicle information list of the storage portion 14. If the read vehicle information contains the emergency brake operation information, the controller 11 assumes the corresponding different vehicle to be an emergency brake vehicle and sets its risk rate. The controller 11 assigns risk rates to all emergency brake vehicles whose vehicle information is stored in the different vehicle information list of the storage portion 14. The controller 11 then performs a display output process (SF11). This display output process has the same contents as those of the display output process at SB14 of the dead-area-approaching vehicle alarm display process described above.

As described above, the emergency brake vehicle alarm display process can allow the display output portion 15 to easily notify the different vehicle with the highest risk rate out of different vehicles around the host vehicle. In this case, the different vehicle with the highest risk rate is equivalent to an emergency brake vehicle that is present in the emergency brake alarm area for the host vehicle. The direction of the light-emitting portion E in the light-emitting area 15*b* represents the direction in which the emergency brake vehicle is present. The length thereof represents the distance to the emergency brake vehicle. The emission color thereof represents the risk rate for the emergency brake vehicle. The controller 11 may allow a speaker (not shown) to generate an alarm sound in response to the display output using illumination of the light-emitting area 15*b*.

Figure 17C:
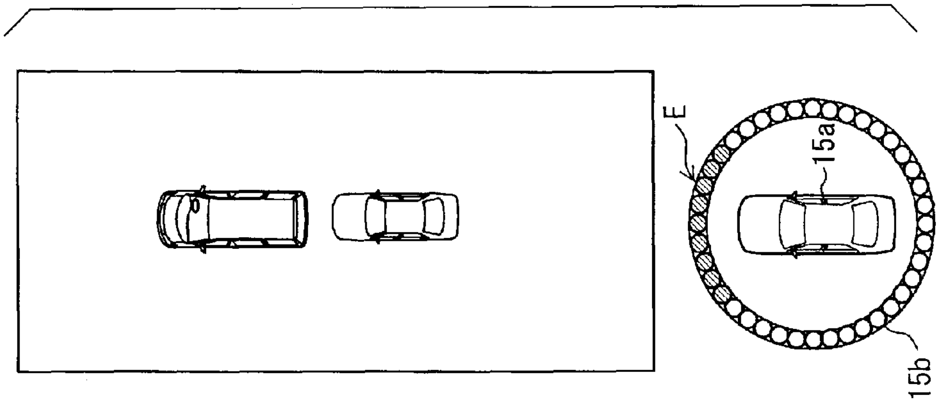
FIGS. 17A, 17B, 17C exemplify situations where the emergency brake vehicle alarm display process is applicable.
Figure 17B:
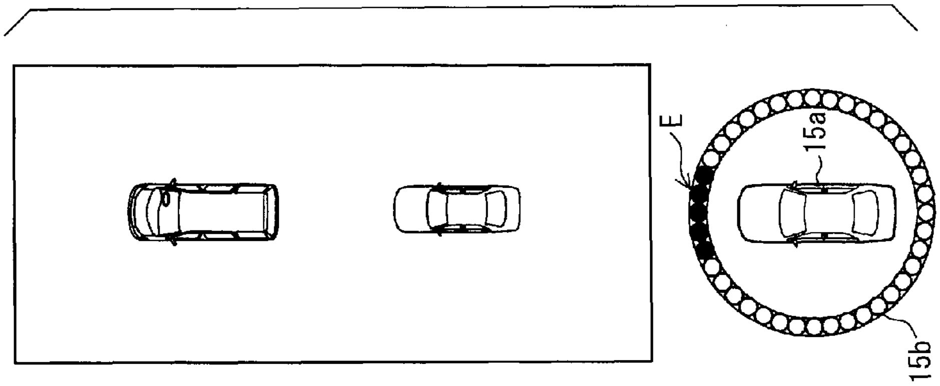
Figure 17A:
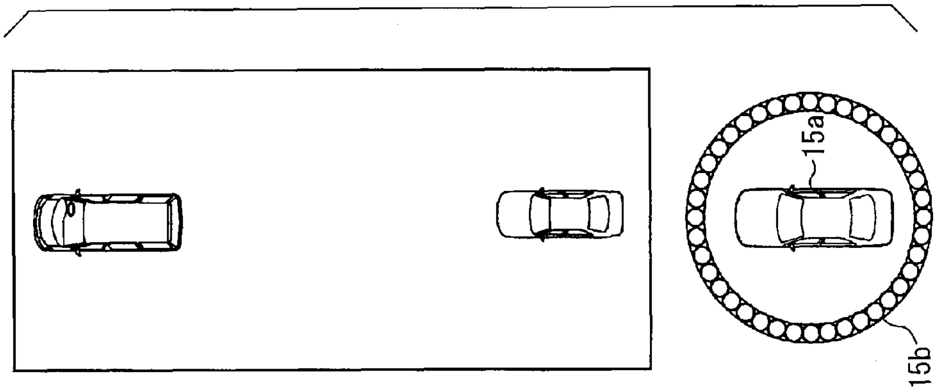

FIGS. 17A, 17B, 17C exemplify situations where the emergency brake vehicle alarm display process is applicable. In FIG. 17A, the controller 11 receives the vehicle information about a different vehicle. The controller 11 then lights the inactive light-emitting area 15*b* in blue as the initial emission color. The controller 11 thereby notifies that a different vehicle is present around the host vehicle. As shown in FIG. 17B, the different vehicle is present in the emergency brake alarm area Ae for the host vehicle and operates the emergency brake. Accordingly, the controller 11 sets the risk rate for the different vehicle to high. The controller 11 lights the light-emitting portion E of the light-emitting area 15*b* in red indicating the alarm. The vehicular display apparatus 10 thereby notifies that the different vehicle with a very high risk rate is present around the host vehicle. In this case, the vehicular display apparatus 10 notifies that the emergency brake vehicle is present. If the brake operation is released on the different vehicle, the vehicular display apparatus 10 sets the risk rate for the different vehicle to middle as shown in FIG. 17C. The vehicular display apparatus 10 lights the light-emitting portion E of the light-emitting area 15*b* in yellow indicating the attention. The vehicular display apparatus 10 thereby notifies that the different vehicle with a relatively high risk rate is present around the host vehicle, or to the left front of the host vehicle in this case.

(5) Front Collision Vehicle Alarm Display Process

Figure 18:
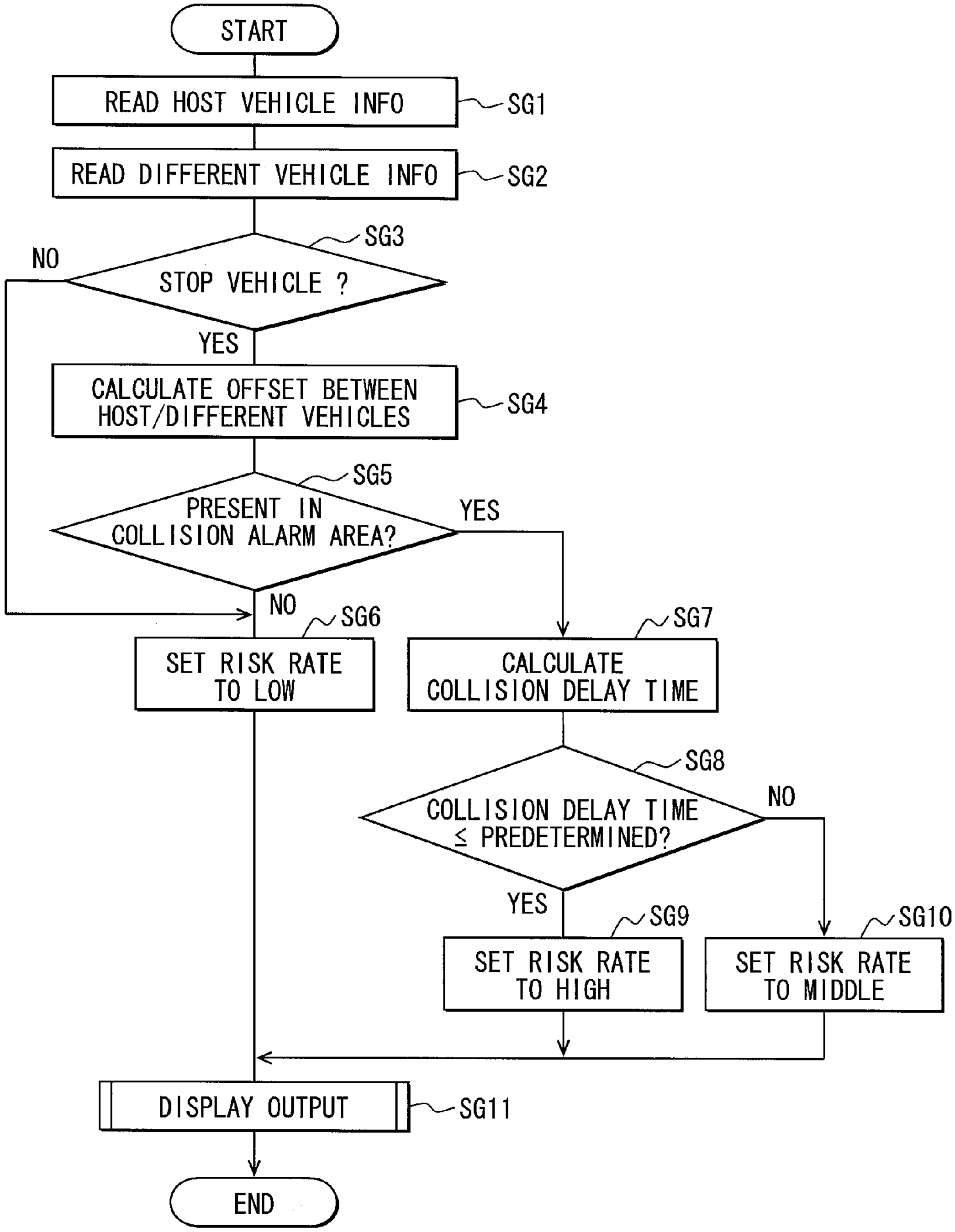
FIG. 18 is a flowchart diagram showing a front collision vehicle alarm display process.
Figure 19:
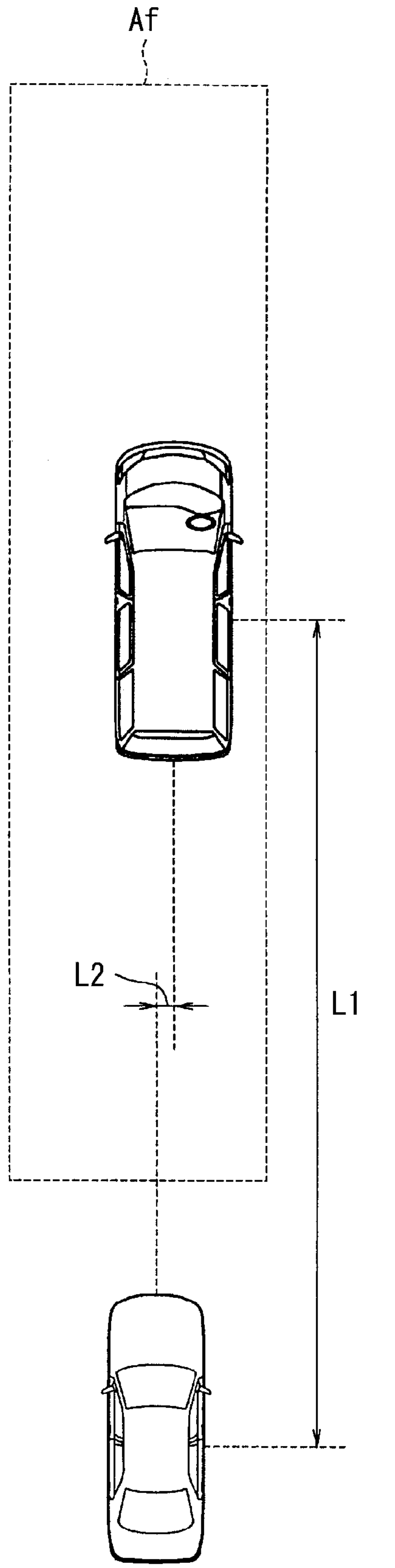
FIG. 19 shows a different vehicle present in a collision alarm area for the host vehicle.

FIG. 18 shows the front collision vehicle alarm display process. The controller 11 reads vehicle information about the host vehicle from the storage portion 14 (SG1). The controller 11 reads vehicle information about the different vehicle from the storage portion 14 (SG2). The controller 11 determines whether the read vehicle information about different vehicles contains vehicle stop information (SG3).

The read vehicle information about different vehicles may contain the vehicle stop information (YES at SG3). In this case, the controller 11 calculates an offset L1 in the longitudinal direction and an offset L2 in the lateral direction between the host vehicle and the different vehicle as shown in FIG. 16 based on the current position information about the host vehicle and the different vehicle (SG4). The current position information about the host vehicle is contained in the vehicle information about the host vehicle. The current position information about the different vehicle is contained in the vehicle information about the different vehicle. Based on the calculated offsets L1 and L2, the controller 11 determines whether a different vehicle is present in a collision alarm area Af for the host vehicle (SG5). The collision alarm area Af is specified ahead of the host vehicle and is longer than the above-mentioned leading vehicle alarm area. If the different vehicle is not present in the collision alarm area Af (NO at SG5), the controller 11 sets the risk rate for the different vehicle to low (SG6). If the vehicle information (read at SG2) about different vehicle does not contain the vehicle stop information (NO at SG3), the controller 11 proceeds to SG6 and sets the risk rate for the different vehicle to low.

If the different vehicle is present in the collision alarm area Af (YES at SG5), the controller 11 calculates collision delay time (SG7) based on the current position information, the running speed information, and the running direction information about the different vehicle and the host vehicle. The current position information, the running speed information, and the running direction information about the different vehicle are contained in the vehicle information about the different vehicle. The collision delay time can be found using the same arithmetic processing as that performed at SD2 described above.

After calculating the collision delay time, the controller 11 compares the collision delay time with a predetermined time (SG8). Any value can be specified as the predetermined time. If the collision delay time is shorter than or equal to the predetermined time (YES at SG8), the controller 11 sets the risk rate for the different vehicle to high (SG9). If the collision delay time is longer than the predetermined time (NO at SG8), the controller 11 sets the risk rate for the different vehicle to middle (SG10).

As described above, the controller 11 sequentially reads the vehicle information about different vehicles stored in the different vehicle information list of the storage portion 14. If the read vehicle information contains the vehicle stop information, the controller 11 assumes the corresponding different vehicle to be a collision alarm vehicle and sets its risk rate. The controller 11 assigns risk rates to all collision alarm vehicles whose vehicle information is stored in the different vehicle information list of the storage portion 14. The controller 11 then performs a display output process (SG11). This display output process has the same contents as those of the display output process at SB14 of the dead-area-approaching vehicle alarm display process described above.

As described above, the front collision vehicle alarm display process can allow the display output portion 15 to easily notify the different vehicle with the highest risk rate out of different vehicles around the host vehicle. In this case, the different vehicle with the highest risk rate is equivalent to a collision alarm vehicle that is present in the collision alarm area for the host vehicle. The direction of the light-emitting portion E in the light-emitting area 15*b* represents the direction in which the collision alarm vehicle is present. The length thereof represents the distance to the collision alarm vehicle.

The emission color thereof represents the risk rate for the collision alarm vehicle. The controller 11 may allow a speaker (not shown) to generate an alarm sound in response to the display output using illumination of the light-emitting area 15*b*.

Figure 20A:
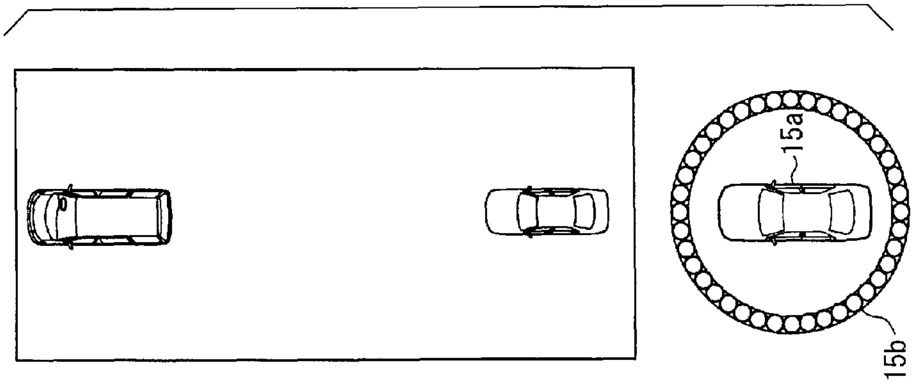
FIGS. 20A, 20B, 20C exemplify situations where the front collision vehicle alarm display process is applicable.
Figure 20B:
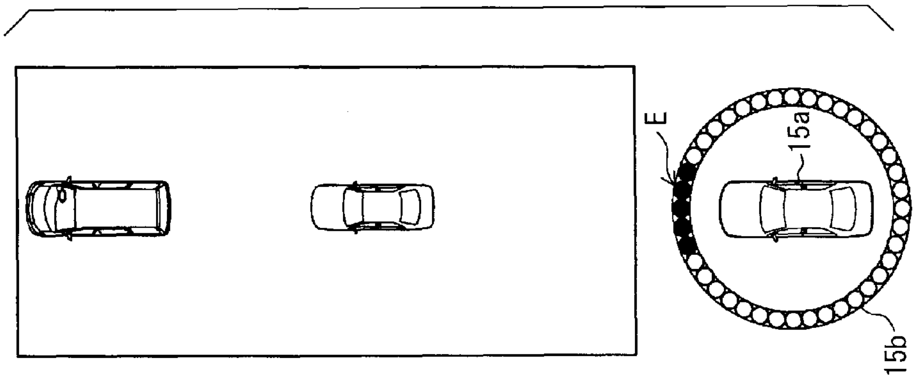
Figure 20C:
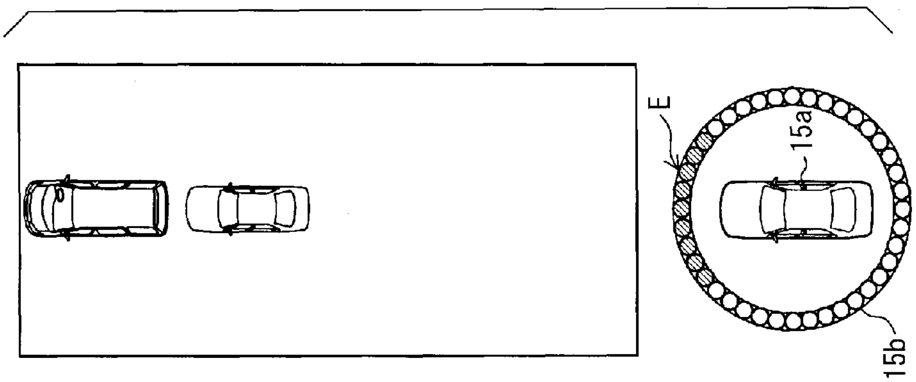

FIGS. 20A, 20B, 20C exemplify situations where the front collision vehicle alarm display process is applicable. In FIG. 20A, the controller 11 receives the vehicle information about a different vehicle. The controller 11 then lights the inactive light-emitting area 15*b* in blue as the initial emission color. The controller 11 thereby notifies that a different vehicle is present around the host vehicle. As shown in FIG. 20B, the different vehicle is present in the collision alarm area Af for the host vehicle and stops. Accordingly, the controller 11 sets the risk rate for the different vehicle to high. The controller 11 lights the light-emitting portion E of the light-emitting area 15*b* in red indicating the alarm. The vehicular display apparatus 10 thereby notifies that the different vehicle with a very high risk rate is present around the host vehicle. In this case, the vehicular display apparatus 10 notifies that the collision alarm vehicle stops ahead of the host vehicle. If the collision alarm vehicle starts running or the host vehicle stops, the vehicular display apparatus 10 sets the risk rate for the collision alarm vehicle to middle as shown in FIG. 20C. The vehicular display apparatus 10 lights the light-emitting portion E of the light-emitting area 15*b* in yellow indicating the attention. The vehicular display apparatus 10 thereby notifies that the different vehicle with a relatively high risk rate is present around the host vehicle, or ahead of the host vehicle in this case.

(6) Intersection-Approaching Vehicle Alarm Display Process

Figure 21:
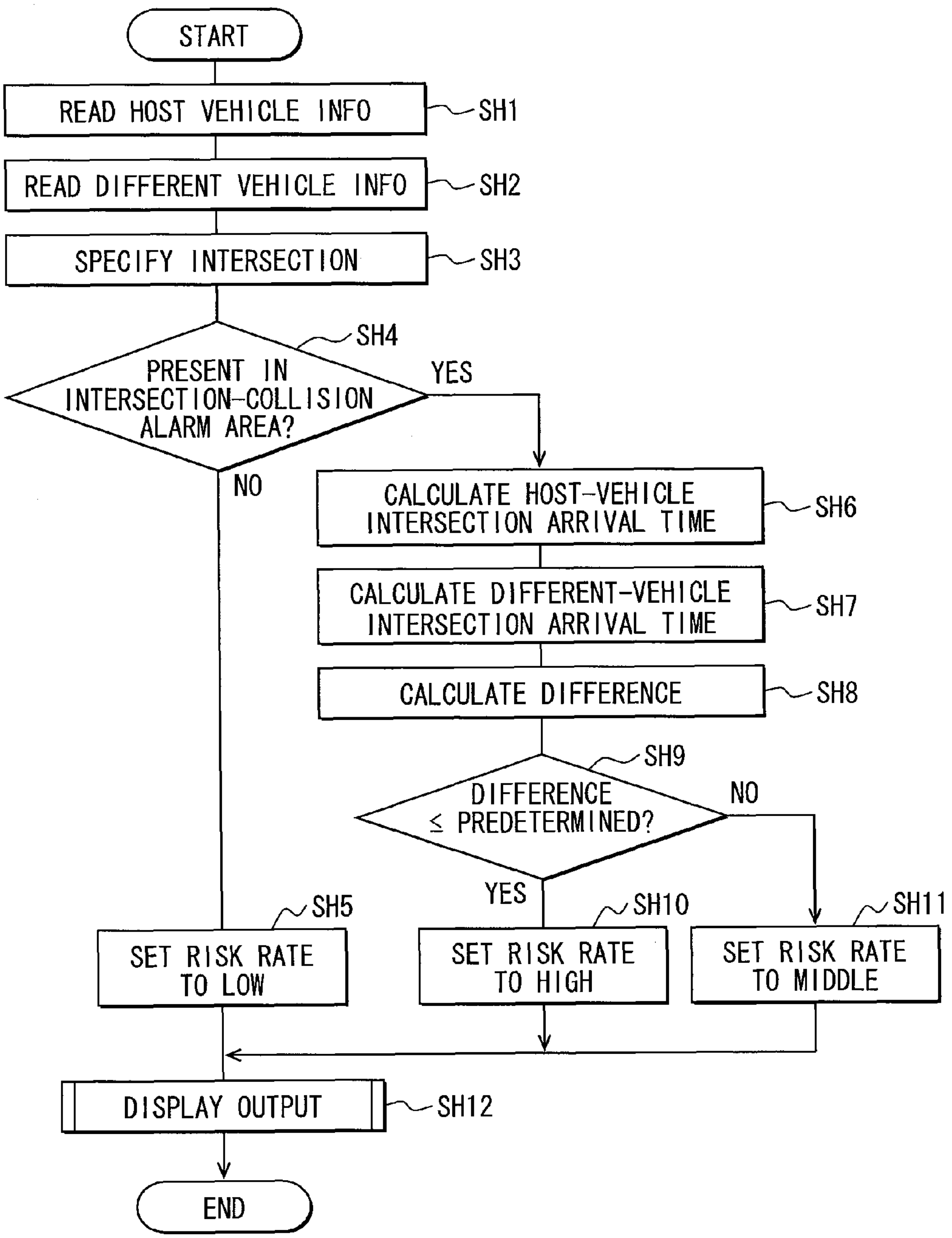
FIG. 21 is a flowchart diagram showing an intersection-approaching vehicle alarm display process.
Figure 22:
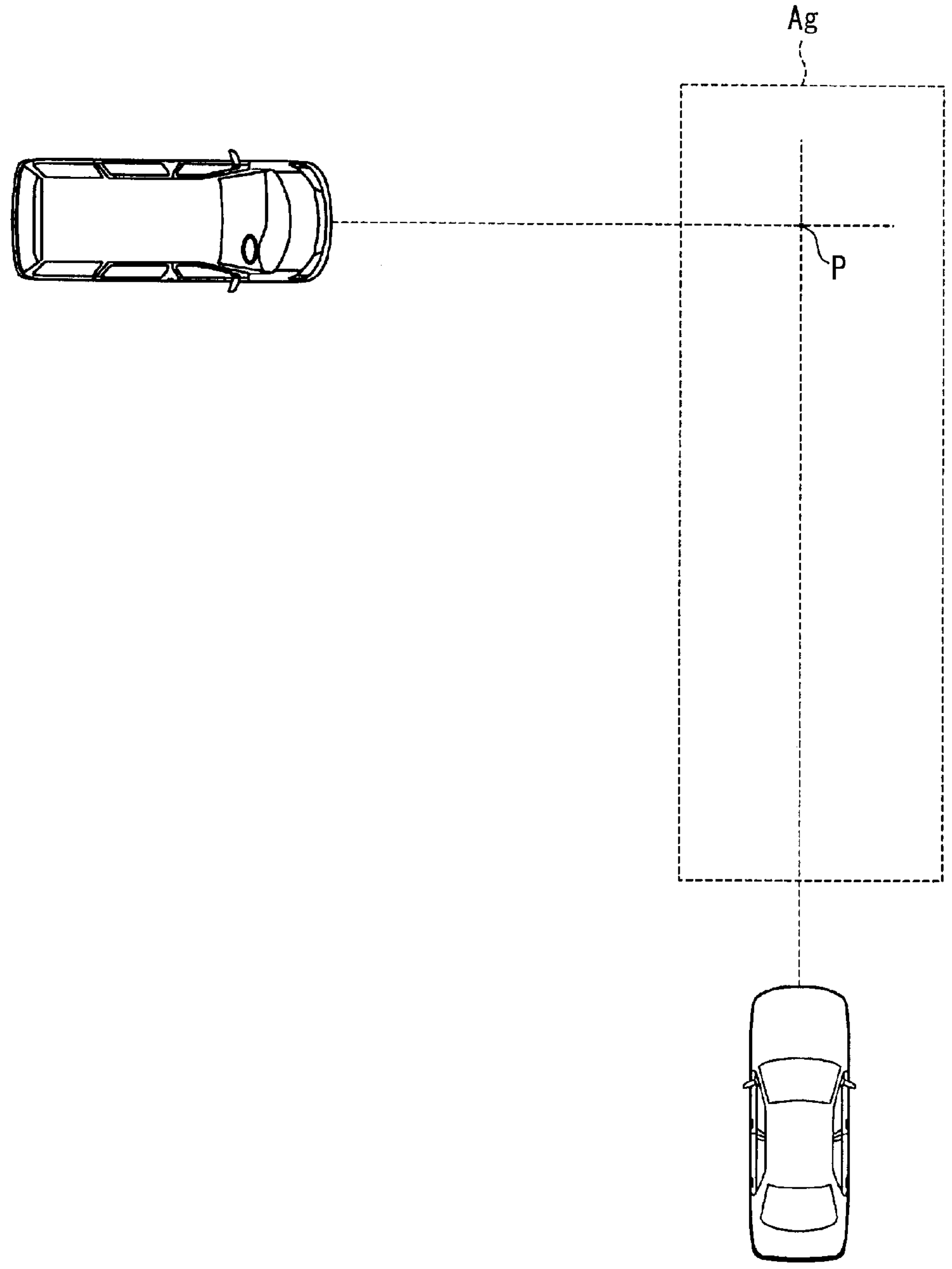
FIG. 22 shows that an intersection-collision alarm area for the host vehicle includes a traveling intersection between the host vehicle and a different vehicle.

FIG. 21 shows the intersection-approaching vehicle alarm display process. The controller 11 reads vehicle information about the host vehicle from the storage portion 14 (SH1). The controller 11 reads vehicle information about the different vehicle from the storage portion 14 (SH2). As shown in FIG. 22, the controller 11 specifies traveling intersection P between the running direction of the host vehicle and that of the different vehicle based on the running direction information about the host vehicle and the different vehicle (SH3). The running direction information about the host vehicle is contained in the vehicle information about the host vehicle. The running direction information about the different vehicle is contained in the vehicle information about the different vehicle. The controller 11 determines whether the specified traveling intersection P is present in an intersection-collision alarm area Ag for the host vehicle (SH4).

If the traveling intersection P is not present in the intersection-collision alarm area Ag (NO at SH4), the controller 11 sets the risk rate for the different vehicle to low (SH5). If the traveling intersection P is present in the intersection-collision alarm area Ag (YES at SH4), the controller 11 uses speed information about the host vehicle to calculate host-vehicle traveling intersection arrival time T1 required for the host vehicle to reach the traveling intersection P (SH6). The controller 11 uses speed information about the different vehicle to calculate different vehicle traveling intersection arrival time T2 required for the different vehicle to reach the traveling intersection P (SH7). The controller 11 calculates a difference between the host-vehicle traveling intersection arrival time T1 and the different vehicle traveling intersection arrival time T2 (SH8). The controller 11 compares the difference with a predetermined value (SH9).

If the difference is smaller than or equal to the predetermined value (YES at SH9), the controller 11 sets the risk rate for the different vehicle to high (SH10). If the difference is larger than the predetermined value (NO at SH9), the controller 11 sets the risk rate for the different vehicle to middle (SH11).

As described above, the controller 11 sequentially reads the vehicle information about different vehicles stored in the different vehicle information list of the storage portion 14. If the intersection-collision alarm area Ag contains the traveling intersection P with the different vehicle whose vehicle information is read, the controller 11 assumes the corresponding different vehicle to be an intersection-collision alarm vehicle and sets its risk rate. The controller 11 assigns risk rates to all intersection-collision alarm vehicles whose vehicle information is stored in the different vehicle information list of the storage portion 14. The controller 11 then performs a display output process (SH12). This display output process has the same contents as those of the display output process at SB14 of the dead-area-approaching vehicle alarm display process described above.

As described above, the intersection-approaching vehicle alarm display process can allow the display output portion 15 to easily notify the different vehicle with the highest risk rate out of different vehicles around the host vehicle. In this case, the different vehicle with the highest risk rate is equivalent to an intersection-collision alarm vehicle whose traveling intersection P with the host vehicle is present in the intersection-collision alarm area Ag. The direction of the light-emitting portion E in the light-emitting area 15*b* represents the direction in which the intersection-collision alarm vehicle is present. The length thereof represents the distance to the intersection-collision alarm vehicle. The emission color thereof represents the risk rate for the intersection-collision alarm vehicle. The controller 11 may allow a speaker (not shown) to generate an alarm sound in response to the display output using illumination of the light-emitting area 15*b*.

Figure 23A:
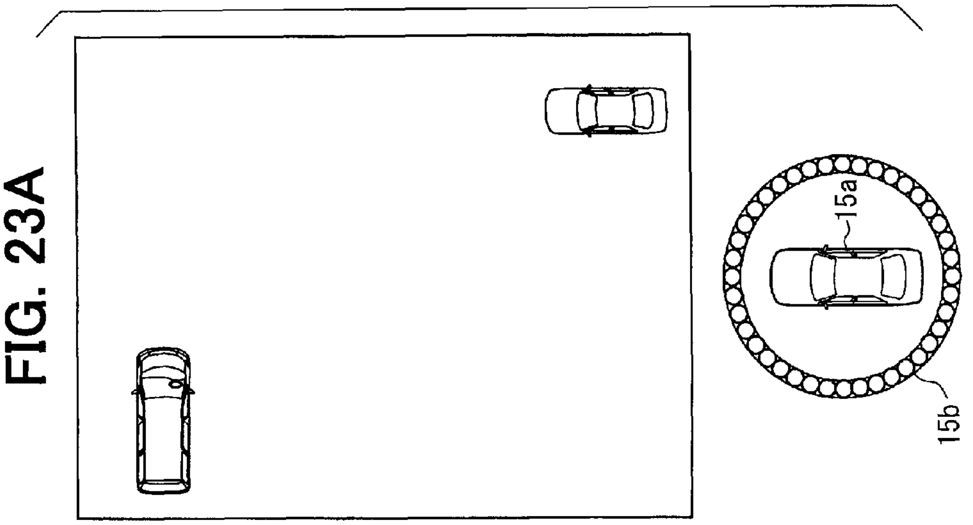
FIGS. 23A, 23B, 23C exemplify situations where the intersection-approaching vehicle alarm display process is applicable.
Figure 23B:
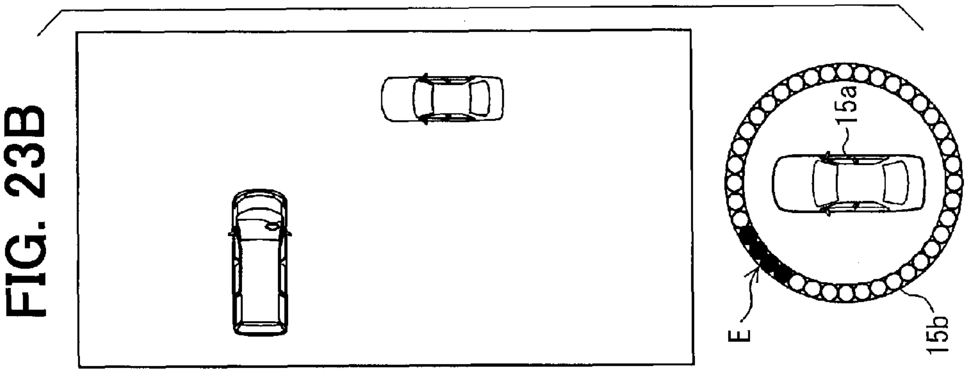
Figure 23C:
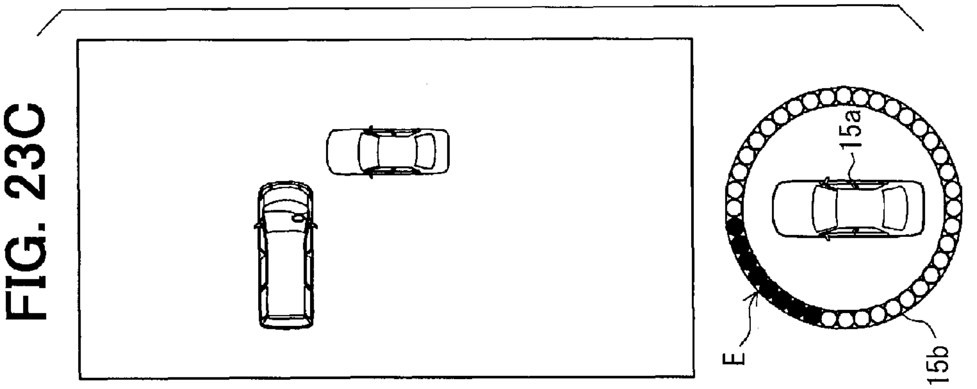

FIGS. 23A, 23B, 23C exemplify situations where the intersection-approaching vehicle alarm display process is applicable. In FIG. 23A, the controller 11 receives the vehicle information about a different vehicle. The controller 11 then lights the inactive light-emitting area 15*b* in blue as the initial emission color. The controller 11 thereby notifies that a different vehicle is present around the host vehicle. As shown in FIGS. 23B and 23C, the traveling intersection P between the different vehicle and the host vehicle is present in the intersection-collision alarm area Ag. Accordingly, the controller 11 sets the risk rate for the different vehicle to high. The controller 11 lights the light-emitting portion E of the light-emitting area 15*b* in red indicating the alarm. The vehicular display apparatus 10 thereby notifies that the different vehicle with a very high risk rate, that is, the intersection-collision alarm vehicle, is present around the host vehicle.

As described above, the vehicular display apparatus 10 according to the embodiment uses the position information about the host vehicle and the different vehicle to specify the direction indicating presence of the different vehicle with reference to the host vehicle. The vehicular display apparatus 10 also specifies the distance between the host vehicle and the different vehicle. The light-emitting area 15*b* is an annular ring-shaped area that is circumferentially provided around the host vehicle mark 15*a* representing the host vehicle. The vehicular display apparatus 10 illuminates part of the light-emitting area 15*b* corresponding to the specified direction for a length associated with the specified distance. For instance, the distance between the host vehicle and the different vehicle decreases, the length increases.

The vehicular display apparatus 10 can represent the direction of the different vehicle with reference to the host vehicle based on the position of illuminated part of the light-emitting area 15*b*. The vehicular display apparatus 10 can represent the distance between the different vehicle and the host vehicle based on the length of illuminated part of the light-emitting area 15*b*. The vehicular display apparatus 10 can use the position and the length of the light-emitting portion E of the light-emitting area 15*b* to provide information about recognition of the different vehicle such as the direction of the different vehicle with reference to the host vehicle and the distance between these vehicles. The vehicular display apparatus 10 differs from a conventional configuration that displays the information about recognition of the different vehicle in accordance with the position of the different vehicle. In other words, in a conventional configuration, a different vehicle is displayed such that as a distance between the host vehicle and the different vehicle increases, the displayed position of the different vehicle generally becomes more distant from the displayed position of the host vehicle; in contrast, in the present embodiment, regardless of the distance between the host vehicle and the different vehicle, the direction of the different vehicle is indicated by using the position of an illuminated part of the light-emitting area 15*b* fixedly arranged around the displayed position 15*a* of the host vehicle and the distance between the host vehicle and the different vehicle can be indicated by using the arc length of the illuminated part of the light-emitting area 15*b*. Thus, the vehicular display apparatus 10 can provide information to recognize a different vehicle remote or distant from the host vehicle as well as a different vehicle near the host vehicle. The vehicular display apparatus 10 provides the information using the position and the length of the light-emitting portion E of the light-emitting area 15*b*. The information can be provided so as to be more easily understandable.

The light-emitting area 15*b* is circularly provided around the host vehicle mark 15*a*. The vehicular display apparatus 10 illuminates part of the light-emitting area 15*b* so as to be arced. The position of the illuminated part of the light-emitting area 15*b* corresponds to the direction specified by the direction specification processor 23. The length thereof corresponds to the distance specified by the distance specification processor 24. If the distance between the host vehicle and the different vehicle is unchanged, the length of the light-emitting portion E of the light-emitting area 15*b* remains unchanged regardless of the direction of the different vehicle with reference to the host vehicle. A sense of distance does not vary with the direction along which the different vehicle is present.

The vehicular display apparatus 10 specifies risk rates for the different vehicle in relation to the host vehicle using different emission colors for the light-emitting portion E of the light-emitting area 15*b*. Based on the emission colors for the light-emitting portion E, the vehicular display apparatus 10 can recognize risk rates for the different vehicle.

The vehicular display apparatus 10 inactivates the light-emitting area 15*b* if position information about the different vehicle is not received. The vehicular display apparatus 10 activates the light-emitting area 15*b* if position information about the different vehicle is received. The light-emitting area 15*b* itself is inactive if no position information is received from a different vehicle. This signifies no different vehicle is present around the host vehicle because position information should be otherwise received from a different vehicle. Accordingly, the user can recognize presence of a different vehicle around the host vehicle if the light-emitting area 15*b* is active. The user can recognize absence of a different vehicle around the host vehicle if the light-emitting area 15*b* is inactive.

Figure 24A:
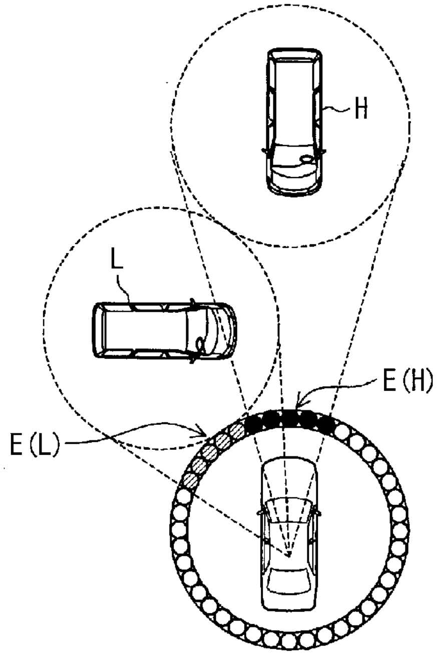
FIGS. 24A, 24B show examples of notifying co-presence of a high-risk different vehicle and a low-risk different vehicle.
Figure 24B:
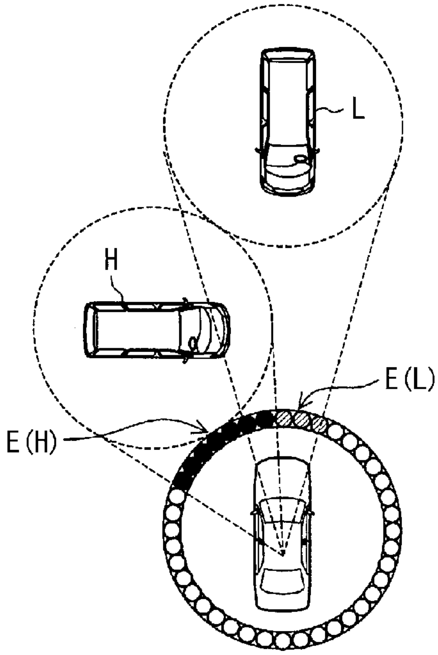

The controller 11 of the vehicular display apparatus 10 can notify presence of different vehicles with a low risk rate as well as a high risk rate. In this case, as shown in FIGS. 24A and 24B, a light-emitting portion E(H) may overlap with a light-emitting portion E(L). The light-emitting portion E(H) indicates a different vehicle H with a high risk rate. The light-emitting portion E(L) indicates a different vehicle L with a low risk rate. The controller 11 uses the emission color for the light-emitting portion E(H) to represent an overlap between the light-emitting portion E(L) and the light-emitting portion E(H). That is, the controller 11 prefers the light-emitting portion E(H) to the light-emitting portion E(L) in order to illuminate an overlap between the light-emitting portion E(L) and the light-emitting portion E(H).

The present disclosure is not limited to the above-mentioned embodiment but is applicable to various embodiments within the spirit and scope of the present disclosure. For example, the present disclosure can be modified or enhanced as follows.

Figure 25:
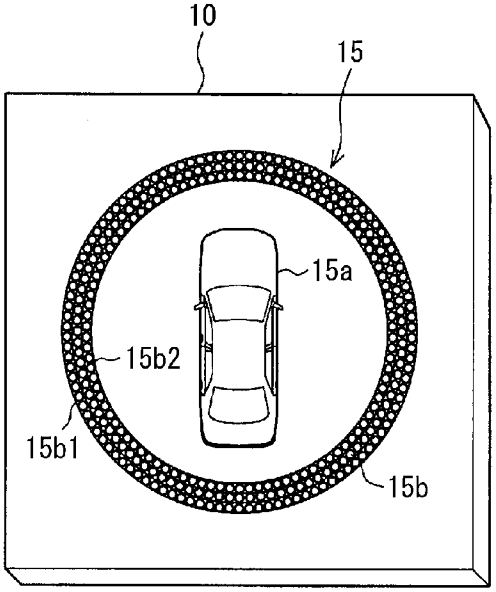
FIG. 25 is a perspective view schematically showing an external view of a modification of the vehicular display apparatus.

The vehicular display apparatus 10 can allow the display control processor 25 to provide display control using not only different colors to represent risk rates for different vehicles but also other display modes. For example, the display control processor 25 may use different blink cycles, illumination patterns, brightness levels, and shapes in accordance with risk rates specified by the risk rate specification processor 26. In a display mode to represent risk rates for different vehicles based on blink cycles, for example, the display control processor 25 may use a short blink cycle for a high risk rate and a long blink cycle for a low risk rate. In a display mode to represent risk rates for different vehicles based on illumination patterns, for example, the display control processor 25 may fast move the illumination pattern for a high risk rate and slowly move the illumination pattern for a low risk rate. In a display mode to represent risk rates for different vehicles based on brightness levels, for example, the display control processor 25 may increase the brightness level for a high risk rate and decrease the brightness level for a low risk rate. In a display mode to represent risk rates for different vehicles based on shapes of the light-emitting area 15*b*, for example, additional light-emitting areas 15*b*1 and 15*b*2 may be provided inside and outside the light-emitting area 15*b* as shown in FIG. 25. The display control processor 25 may activate the additional light-emitting areas 15*b*1 and 15*b*2 as well for a high risk rate to display a thick illumination line as a whole. The display control processor 25 may inactivate the additional light-emitting areas 15*b*1 and 15*b*2 for a low risk rate to display a thin illumination line as a whole.

Figure 26:
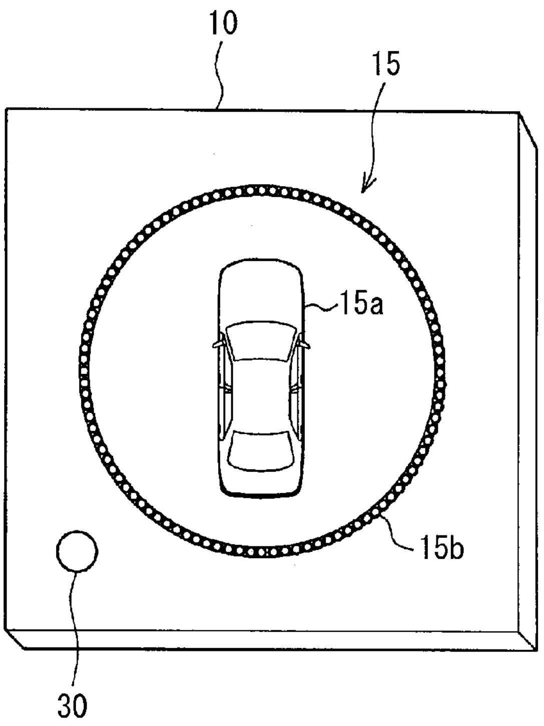
FIG. 26 is a perspective view schematically showing an external view of another modification of the vehicular display apparatus.

As shown in FIG. 26, the vehicular display apparatus 10 may be additionally provided with a position information reception indicator 30 that indicates reception of position information about a different vehicle. The position information reception indicator 30 may use a light-emitting element such as an LED. The controller 11 inactivates or turns off the position information reception indicator 30 if no position information about a different vehicle is received. The controller 11 activates or turns on the position information reception indicator 30 if position information about a different vehicle is received. The position information reception indicator 30 can also notify whether a different vehicle is present. This configuration provides a special indicator independently of the light-emitting area 15*b* in order to notify that position information about a different vehicle has been received. For example, this configuration can keep the light-emitting area 15*b* inactive if position information about a different vehicle is received but the different vehicle is present too far away to call attention. The position information reception indicator 30 can be activated to just notify that the position information has been received. The position information reception indicator 30 may be provided as an image displayed on a liquid crystal panel (not shown), for example. In this case, the number of antennas (i.e., standing bars in a row) as applied to mobile telephones may represent positional relationship between host and different vehicles. Specifically, a few antennas are displayed if a different vehicle is remote or distant from the host vehicle. Many antennas are displayed if a different vehicle approximates to the host vehicle.

Figure 27:
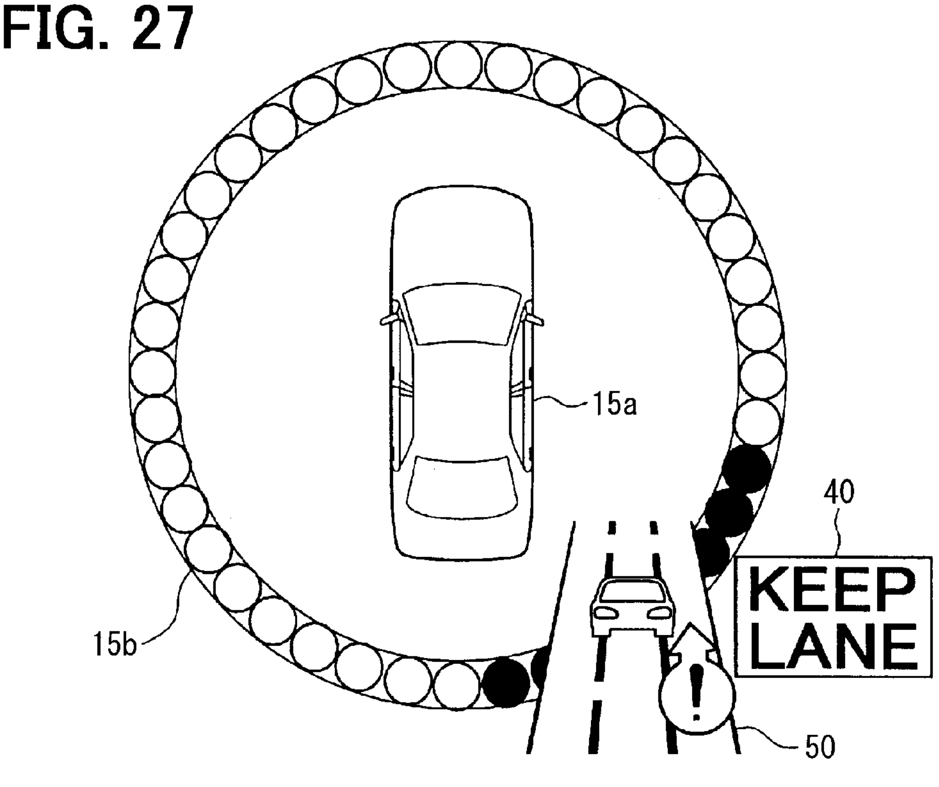
FIG. 27 shows a modification of activating a light-emitting portion of a light-emitting area.

FIG. 27 shows an example of the display output portion 15 displayed as an image on a liquid crystal panel. During the display control process of the display control processor 25, the vehicular display apparatus 10 may display the light-emitting portion E of the light-emitting area 15*b* in red indicating the alarm and display an alarm message 40 and an alarm icon 50. The alarm message 40 and the alarm icon 50 notify that a different vehicle is present around the host vehicle. To do this, the alarm message 40 mainly provides text information. The alarm icon 50 mainly provides image information. FIG. 27 corresponds to the display example in FIG. 8B. According to the situation in FIG. 8B, the different vehicle is present in the dead area Aa(R) to the right of the host vehicle and the host vehicle is going to change the lane to the right. The alarm message 40 may provide an instruction to stop changing the lane. The alarm icon 50 may visually represent that the different vehicle is approaching to the right rear of the host vehicle.

It may be preferable not to display the alarm message 40 and the alarm icon 50 at fixed positions. As shown in FIG. 27, the alarm message 40 and the alarm icon 50 may be displayed so as to correspond to the light-emitting portion E of the light-emitting area 15*b* when the light-emitting portion E is displayed in red indicating the alarm. This enables to easily recognize where the different vehicle is approaching the host vehicle and the host vehicle may be exposed to danger. The alarm message 40 and the alarm icon 50 may be resized in accordance with the length of the light-emitting portion E displayed in an alarm color. Both or at least one of the alarm message 40 and the alarm icon 50 may be displayed.

If provided circumferentially, the light-emitting area 15*b* is not limited to a circle. The light-emitting area may be shaped into an oval or a polygon. The ring-shaped or circumferential light-emitting area may be provided intermittently rather than continuously.

While the vehicular display apparatus 10 is provided as a stand-alone apparatus, the present disclosure is not limited thereto. The vehicular display apparatus 10 may be provided in conjunction with other apparatuses. The vehicular display apparatus 10 may be connected to an onboard apparatus such as a car navigation system through a wireless or wired communication line. The display output portion 15 may be provided as a display screen on a display of the onboard apparatus. The vehicular display apparatus 10 may be connected to a multifunctional mobile communication terminal through a wireless or wired communication line. The display output portion 15 may be provided as a display screen on a display of the multifunctional mobile communication terminal.

What is claimed is:

1. A vehicular display apparatus in a host vehicle, the vehicular display apparatus comprising:

a display portion having a ring-shaped display area that represents a presence of a different vehicle that is distant from the host vehicle;

a direction specification processor to specify a direction indicating presence of the different vehicle with reference to the host vehicle based on position information about the host vehicle and the different vehicle;

a distance specification processor to specify a distance between the different vehicle and the host vehicle based on the position information about the host vehicle and the different vehicle; and a display control processor to display a displayed part of the ring-shaped display area, the displayed part having a center that is fixed based on the direction specified by the direction specification processor, the displayed part having a length that is fixed based on the distance specified by the distance specification processor such that the length increases as the distance between the different vehicle and the host vehicle decreases.

2. The vehicular display apparatus according to claim 1, comprising:

a risk rate specification processor to specify a risk rate for the different vehicle with reference to the host vehicle, wherein the display control processor displays the ring-shaped display area in accordance with a display mode corresponding to the risk rate specified by the risk rate specification processor.

3. The vehicular display apparatus according to claim 1, wherein the display control processor inactivates the ring-shaped display area in case of not receiving position information about the different vehicle and activates the ring-shaped display area in case of receiving position information about the different vehicle.

4. The vehicular display apparatus according to claim 1, further comprising:

a position information reception indicator to notify that position information about the different vehicle is received, wherein the display control processor inactivates the position information reception indicator in case of not receiving position information about the different vehicle and activates the position information reception indicator in case of receiving position information about the different vehicle.

5. The vehicular display apparatus according to claim 1, wherein the ring-shaped display area includes a plurality of circumferentially arranged light-emitting elements.

6. The vehicular display apparatus according to claim 1, wherein the ring-shaped display area is circumferentially provided around a host vehicle mark indicating the host vehicle.

7. The vehicular display apparatus according to claim 1, wherein:

the display portion is capable of displaying the ring-shaped display area on a display screen; and the display control processor further displays at least one of an alarm message and an alarm icon at a position corresponding to the direction specified by the direction specification processor simultaneously when displaying the displayed part of the ring-shaped display area such that the displayed part is determined based on the direction specified by the direction specification processor and has the length that is determined based on the distance specified by the distance specification processor.

8. The vehicular display apparatus according to claim 1, wherein:

when fixing the length of the displayed part of the ring-shaped display, the display control processor defines (i) a first coverage circle of the host vehicle with a first predetermined radius and a first center corresponding to a present position of the host vehicle and (ii) a second coverage circle of the different vehicle with a second predetermined radius and a second center corresponding to a present position of the different vehicle, based on the position information about the host vehicle and the different vehicle, draws both tangent lines relative to the second coverage circle from the first center of the first coverage circle of the host vehicle, finding a divided circle of the first coverage circle divided by both the tangent lines, and fixes the length of the displayed part of the ring-shaped display based on the divided circle of the first coverage circle divided by both the tangent lines.

9. A vehicular display apparatus in a host vehicle, the vehicular display apparatus comprising:

a display portion having a ring-shaped display area that represents a presence of a different vehicle that is distant from the host vehicle;

a direction specification processor to specify a direction indicating the presence of the different vehicle with reference to the host vehicle based on position information about the host vehicle and the different vehicle;

a distance specification processor to specify a distance between the different vehicle and the host vehicle based on the position information about the host vehicle and the different vehicle; and a display control processor to define (i) a first coverage circle of the host vehicle with a first predetermined radius and a first center corresponding to a present position of the host vehicle and (ii) a second coverage circle of the different vehicle with a second predetermined radius and a second center corresponding to a present position of the different vehicle, based on the position information about the host vehicle and the different vehicle, draw both tangent lines relative to the second coverage circle of the different vehicle from the first center of the first coverage circle of the host vehicle, finding a divided circle of the first coverage circle area divided by both the tangent lines, and highlight a displayed arc part of the ring-shaped display area, the displayed arc part having a center that is based on the direction specified by the direction specification processor, the displayed arc part having a length that is fixed based on the divided circle of the first coverage circle divided by both the tangent lines.

* * * * *